Aug. 26, 1969  M. A. SCHWEIKER ETAL  3,463,695
APPARATUS FOR PRODUCING CERAMIC TILE ASSEMBLIES
Filed June 23, 1966  26 Sheets-Sheet 2
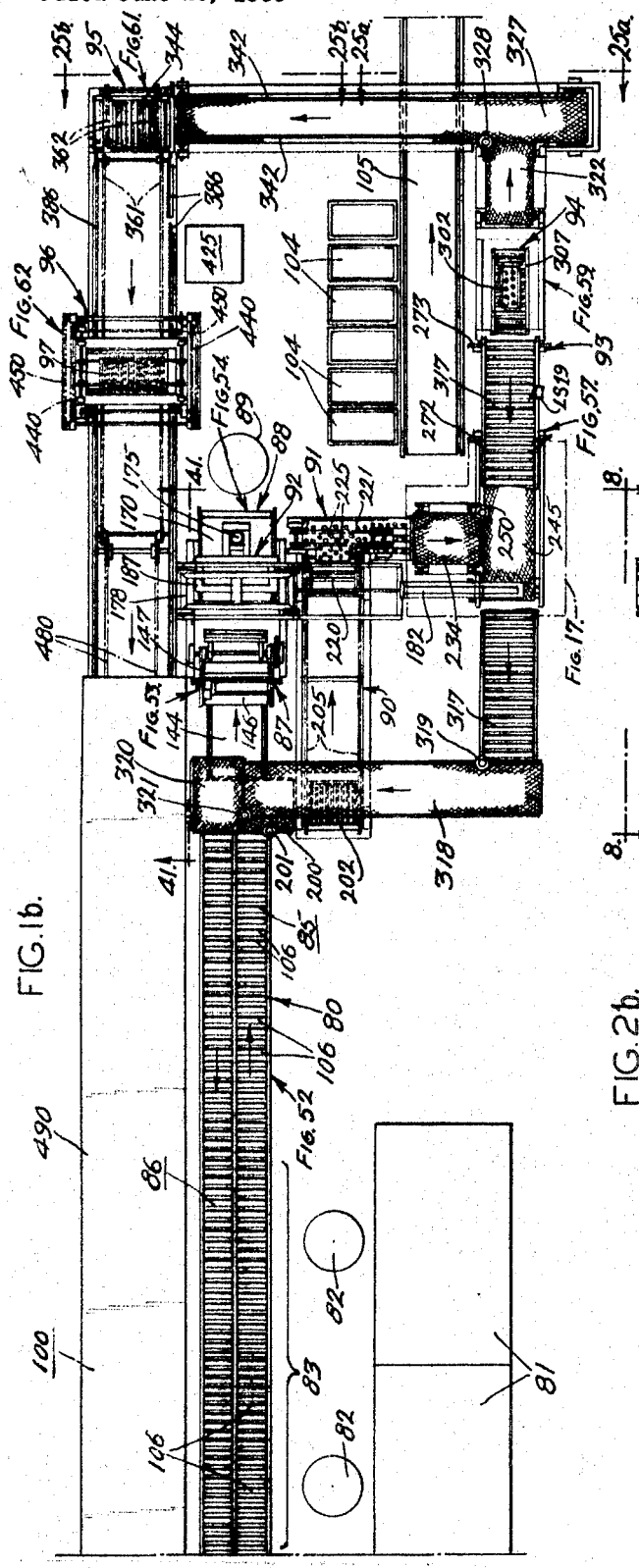
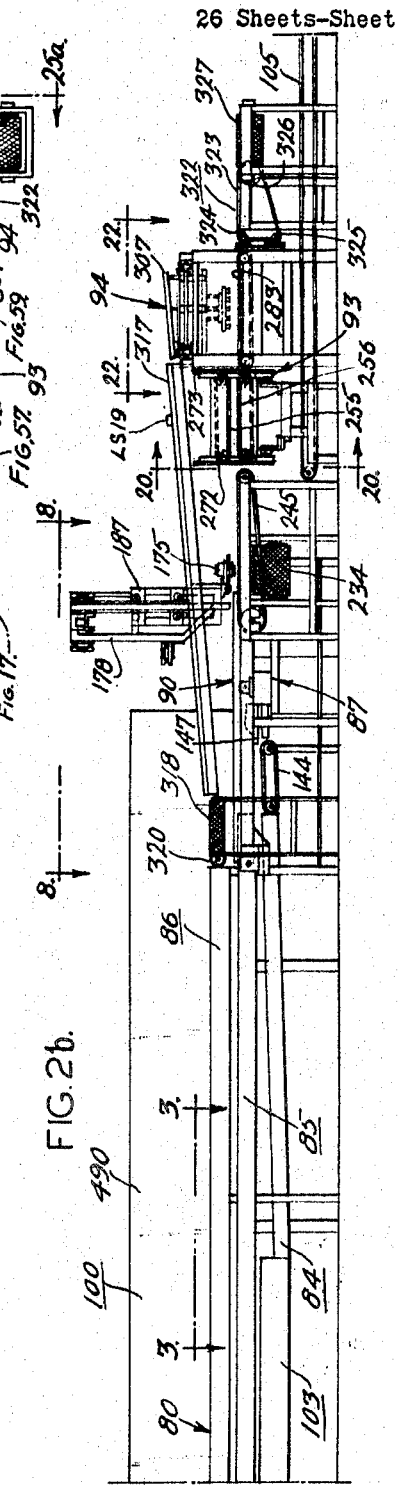
INVENTORS:
MALCOLM A. SCHWEIKER
WAYNE C. WATSON
BY Howson & Howson
ATTYS.

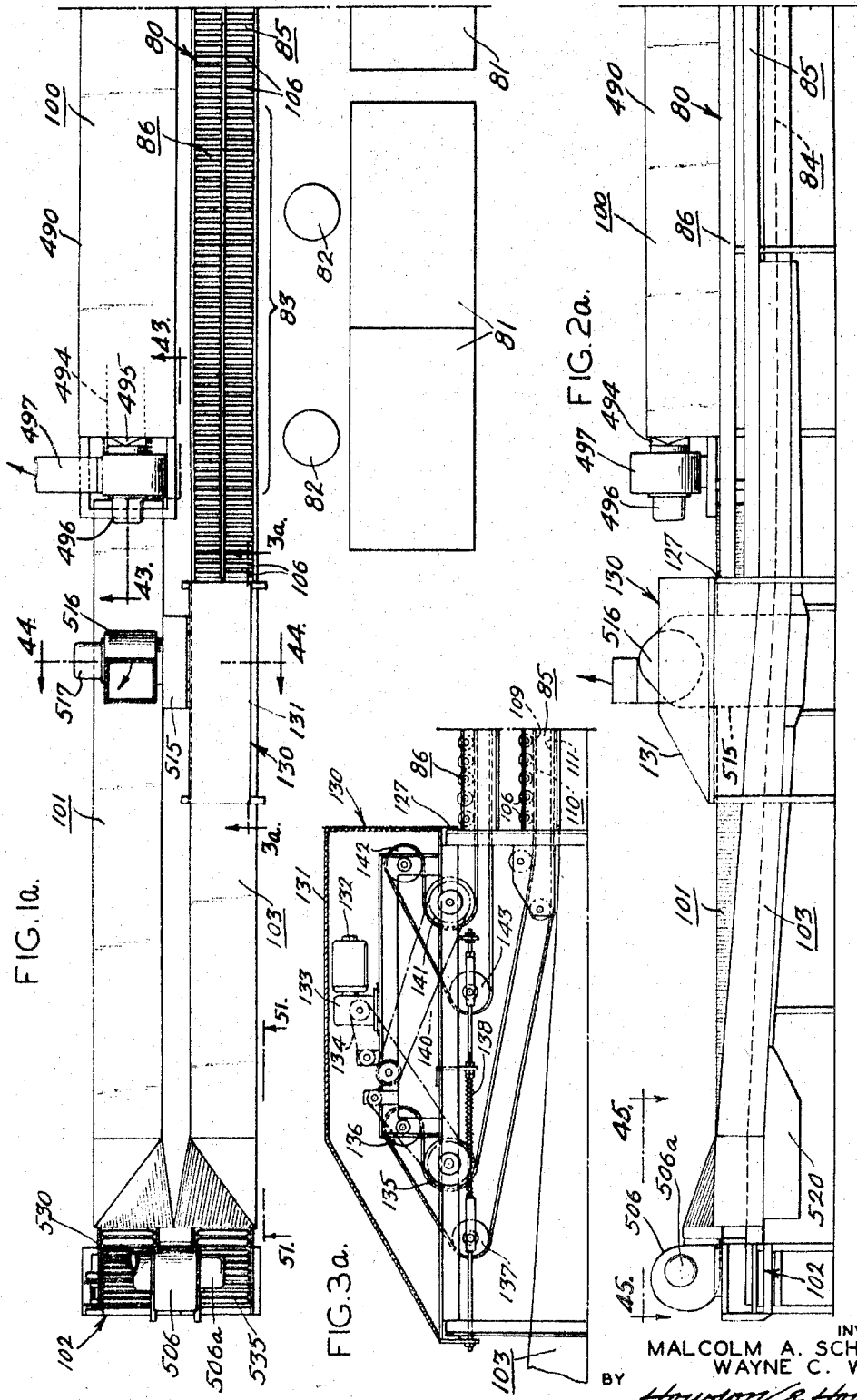

Aug. 26, 1969  M. A. SCHWEIKER ET AL  3,463,695
APPARATUS FOR PRODUCING CERAMIC TILE ASSEMBLIES
Filed June 23, 1966  26 Sheets-Sheet 3
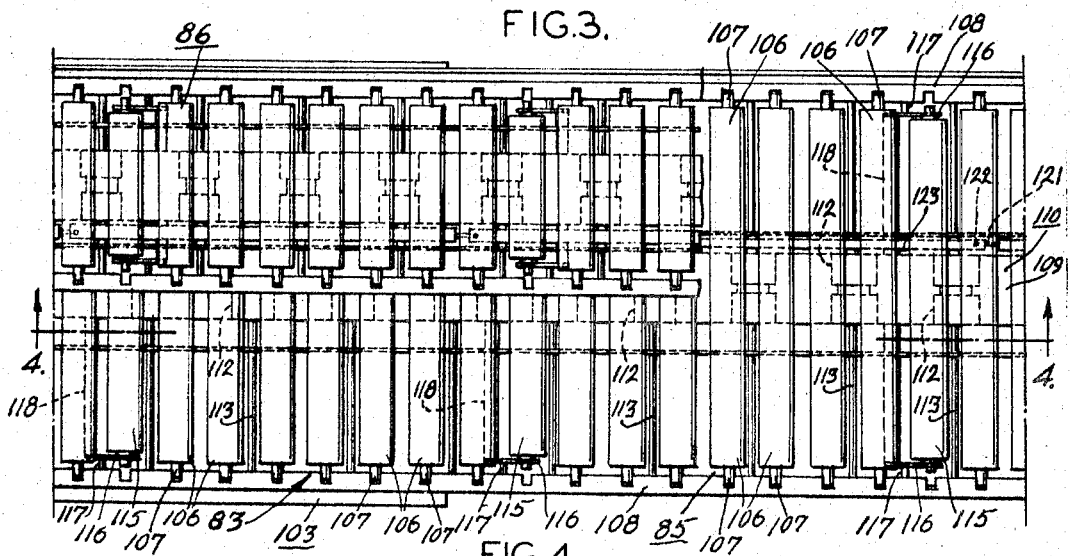
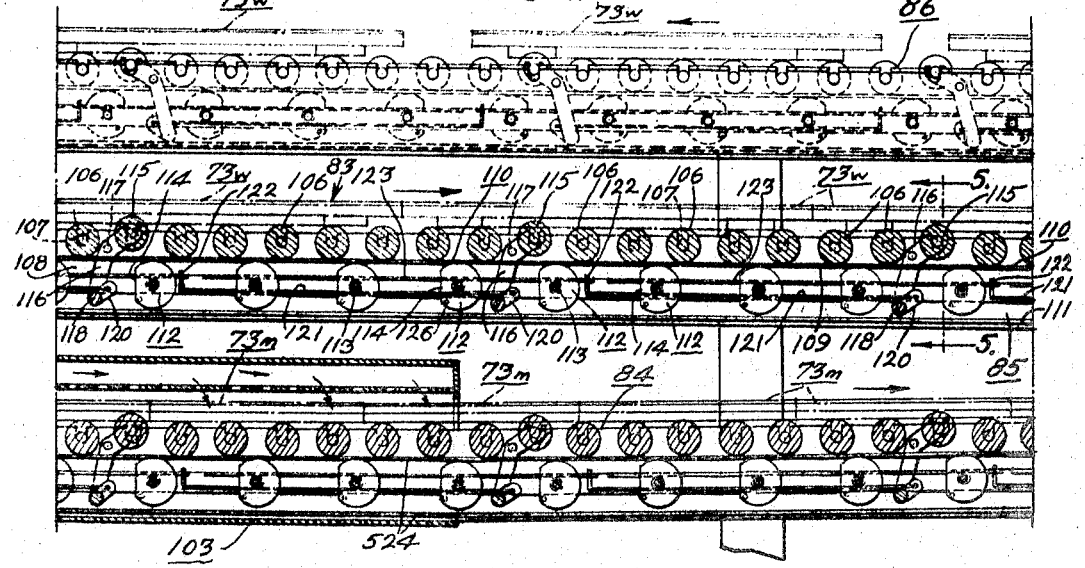
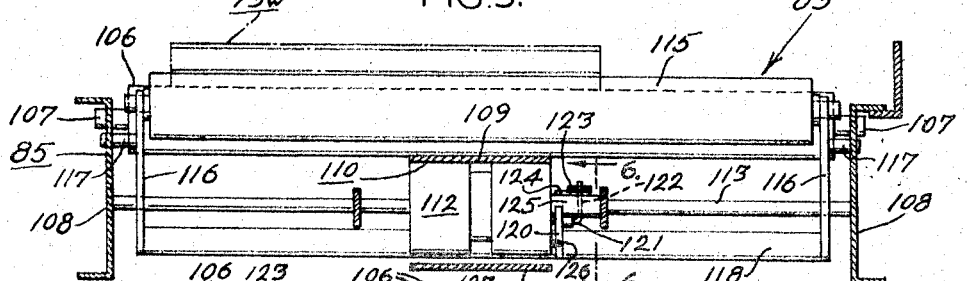
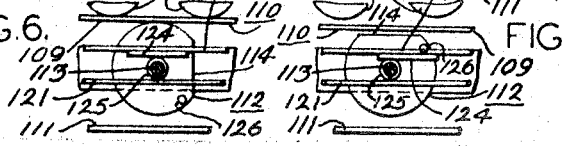
INVENTORS:
MALCOLM A. SCHWEIKIER
WAYNE C. WATSON
BY Howson & Howson
ATTYS.

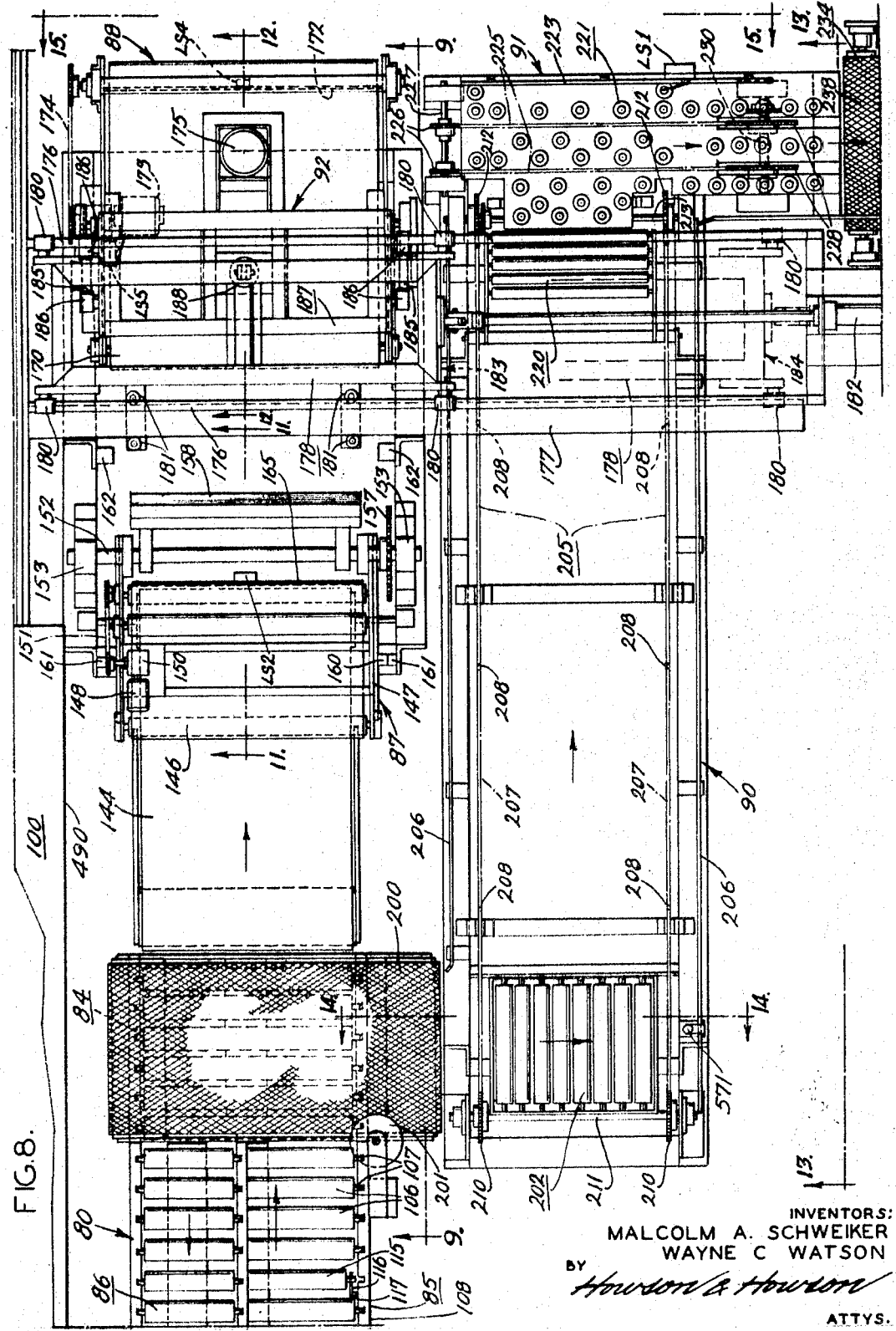

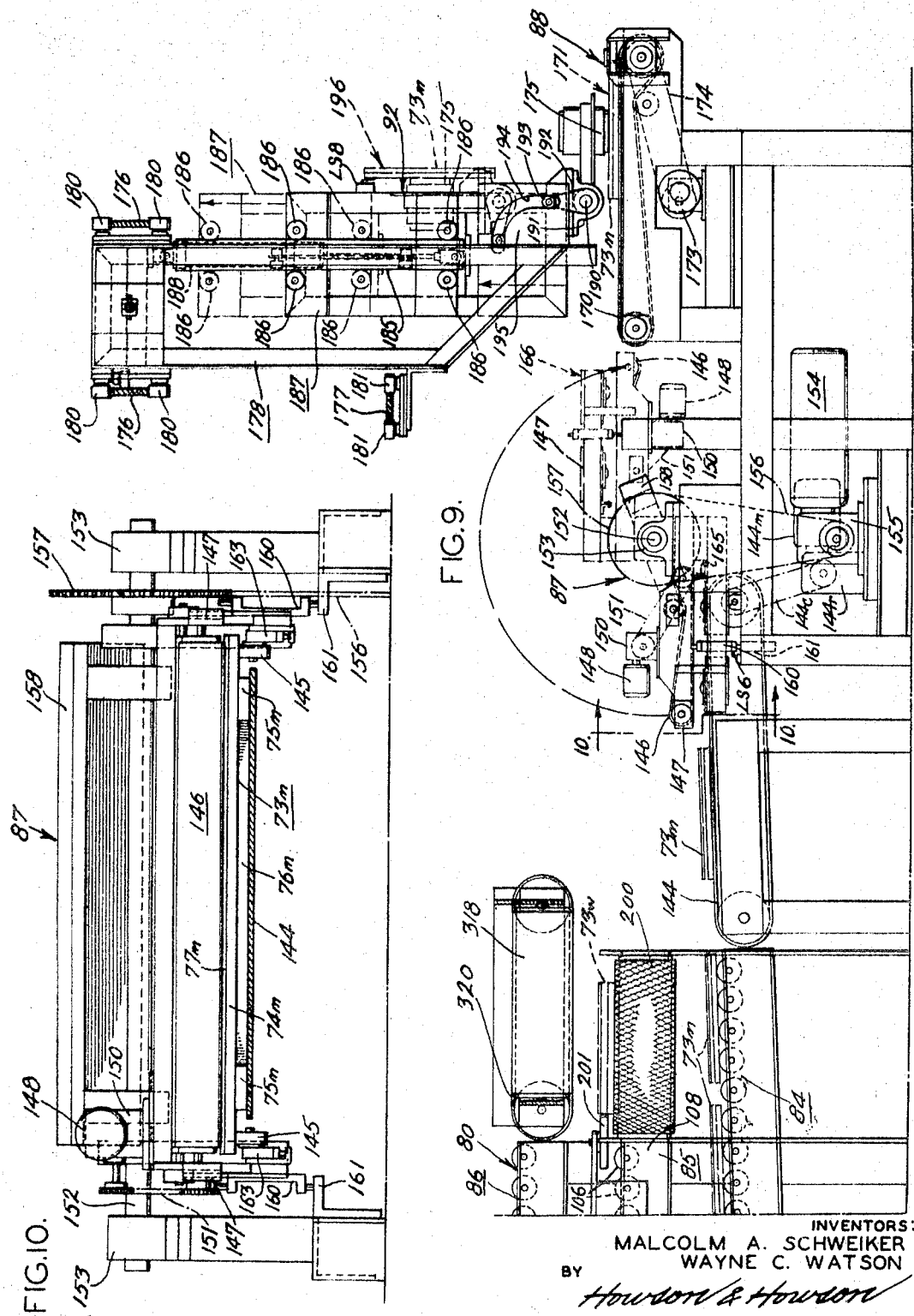

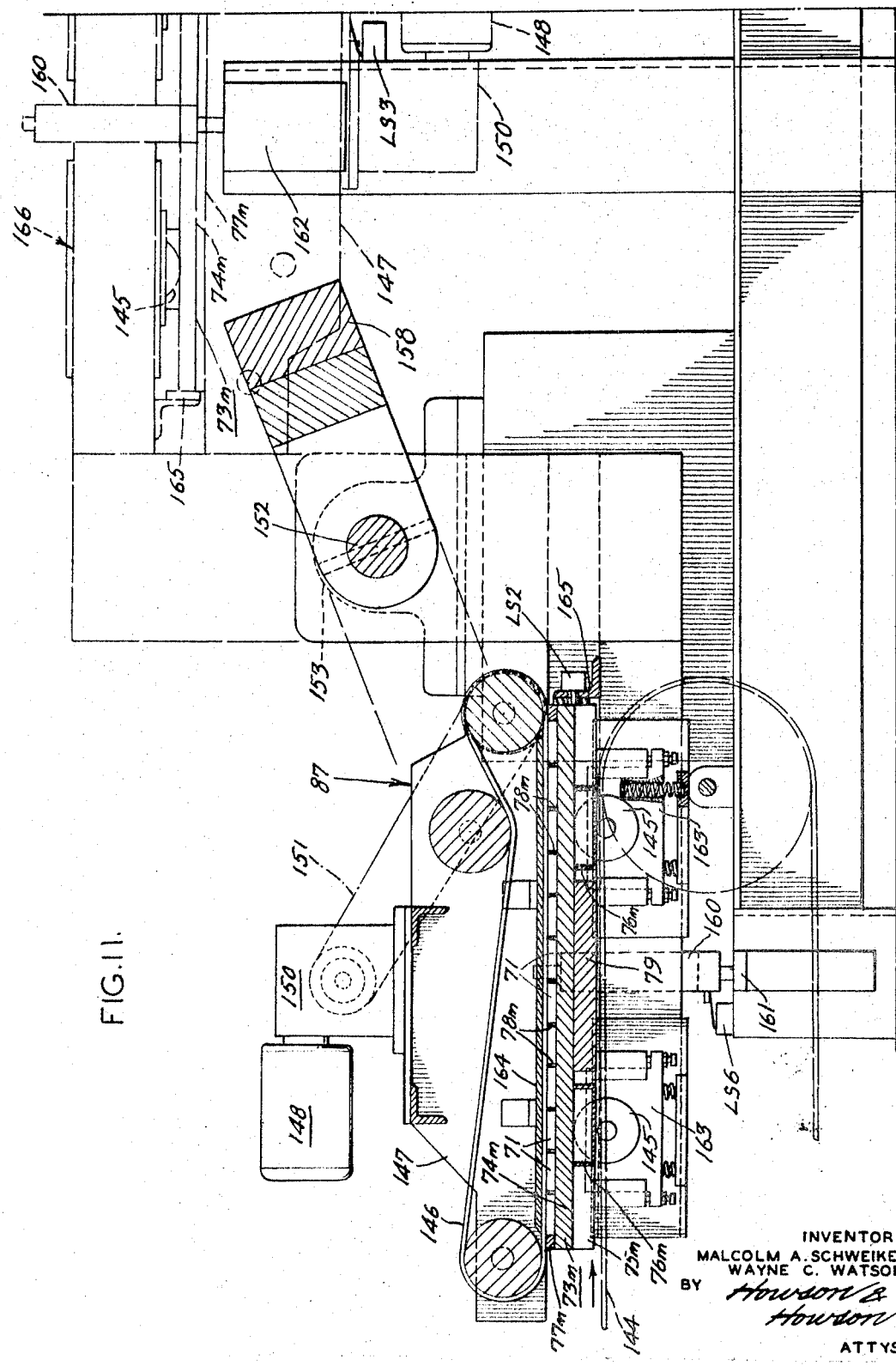

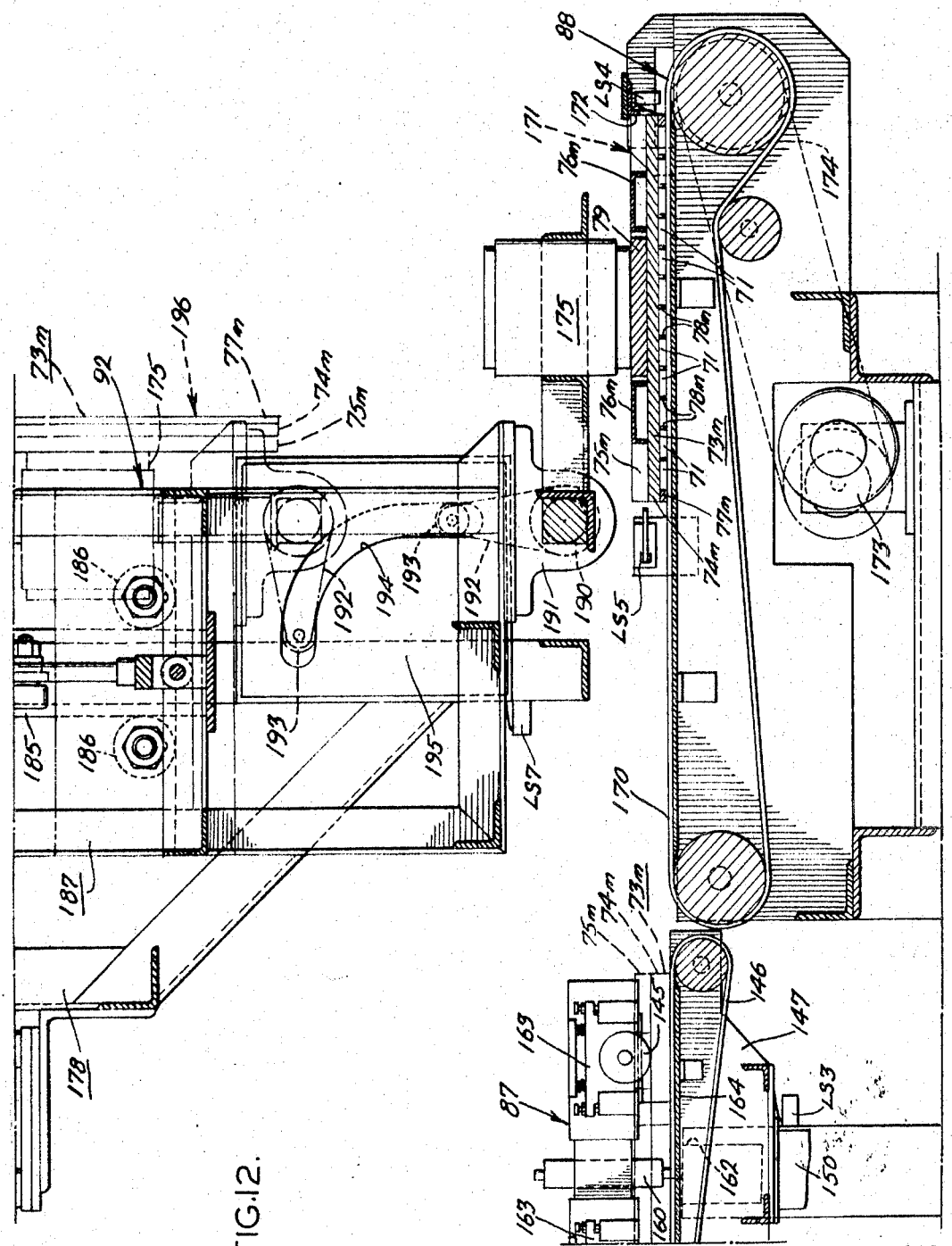

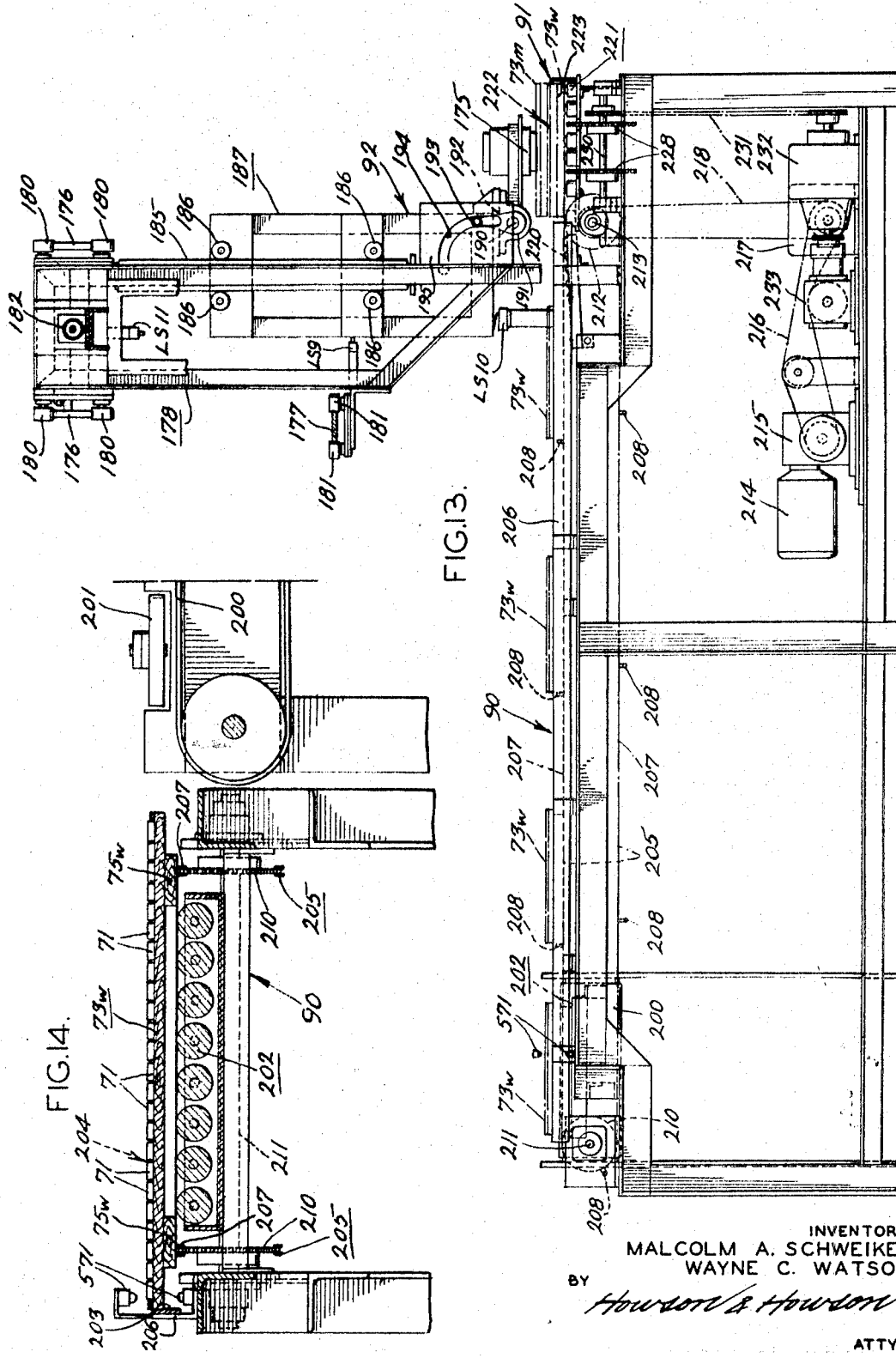

INVENTORS:
MALCOLM A. SCHWEIKER
WAYNE C. WATSON
BY
Howson & Howson
ATTYS.

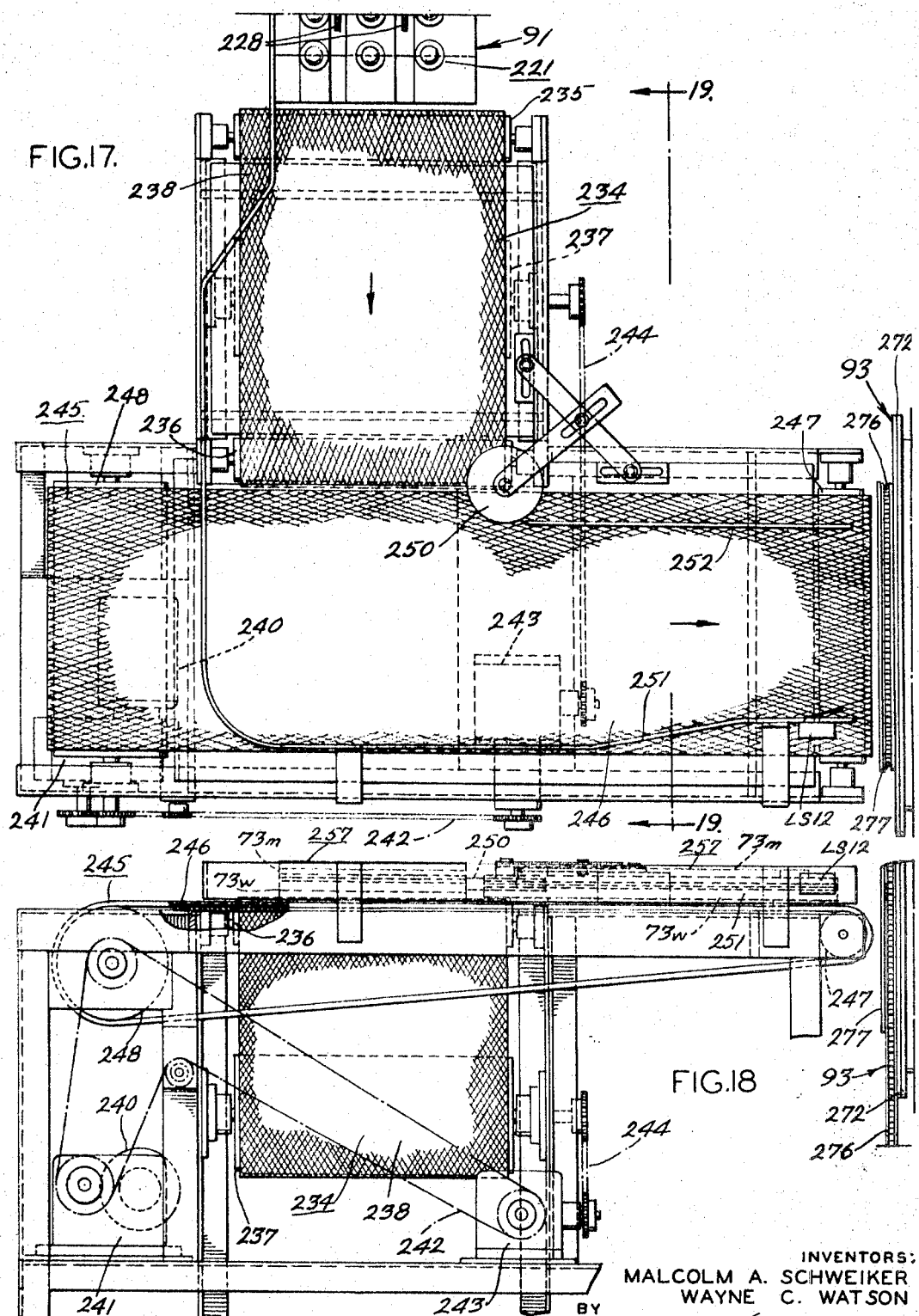

Aug. 26, 1969 M. A. SCHWEIKER ETAL 3,463,695
APPARATUS FOR PRODUCING CERAMIC TILE ASSEMBLIES
Filed June 23, 1966 26 Sheets-Sheet 11
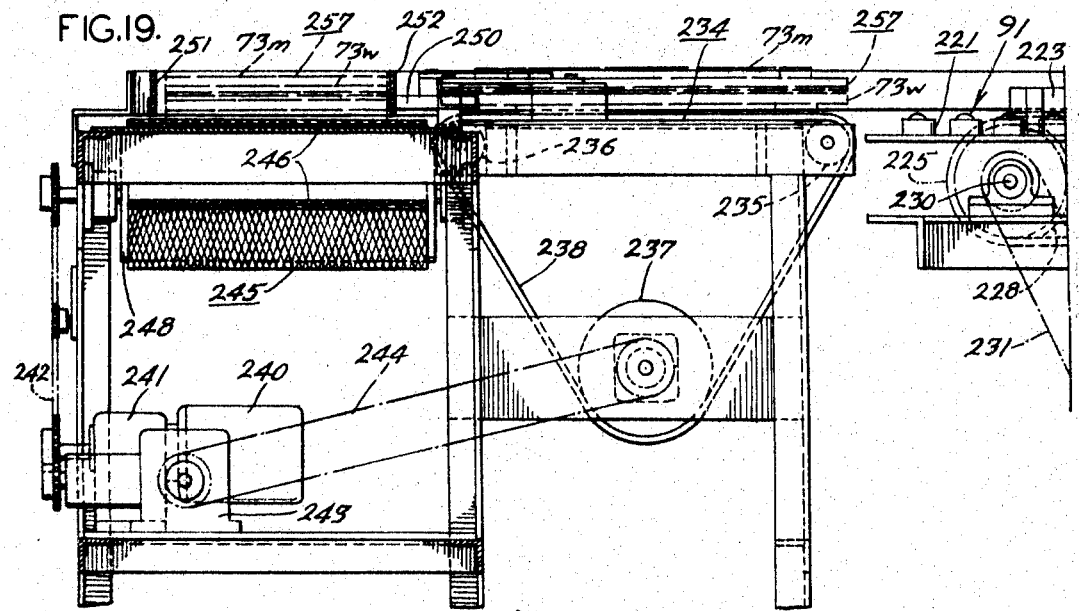
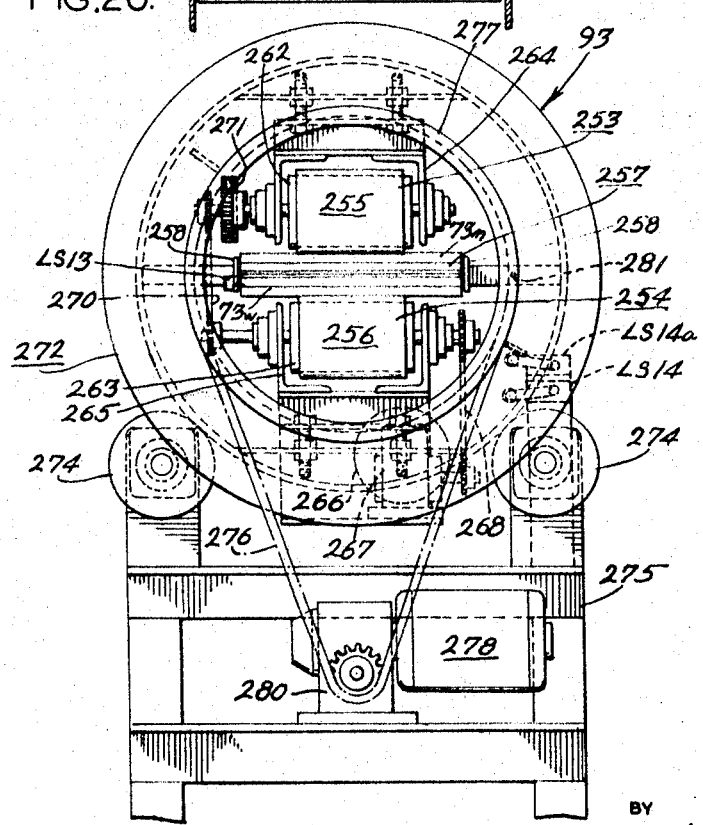
INVENTORS:
MACOLM A. SCHWEIKER
WAYNE C. WATSON
BY
Howson & Howson
ATTYS.

Aug. 26, 1969    M. A. SCHWEIKER ETAL    3,463,695
APPARATUS FOR PRODUCING CERAMIC TILE ASSEMBLIES
Filed June 23, 1966    26 Sheets-Sheet 12

INVENTORS:
MALCOLM A. SCHWEIKER
WAYNE C. WATSON
BY Howson & Howson
ATTYS.

INVENTORS:
MALCOLM A. SCHWEIKER
WAYNE C. WATSON
BY Howson & Howson
ATTYS.

Aug. 26, 1969 M. A. SCHWEIKER ET AL 3,463,695
APPARATUS FOR PRODUCING CERAMIC TILE ASSEMBLIES
Filed June 23, 1966 26 Sheets-Sheet 14
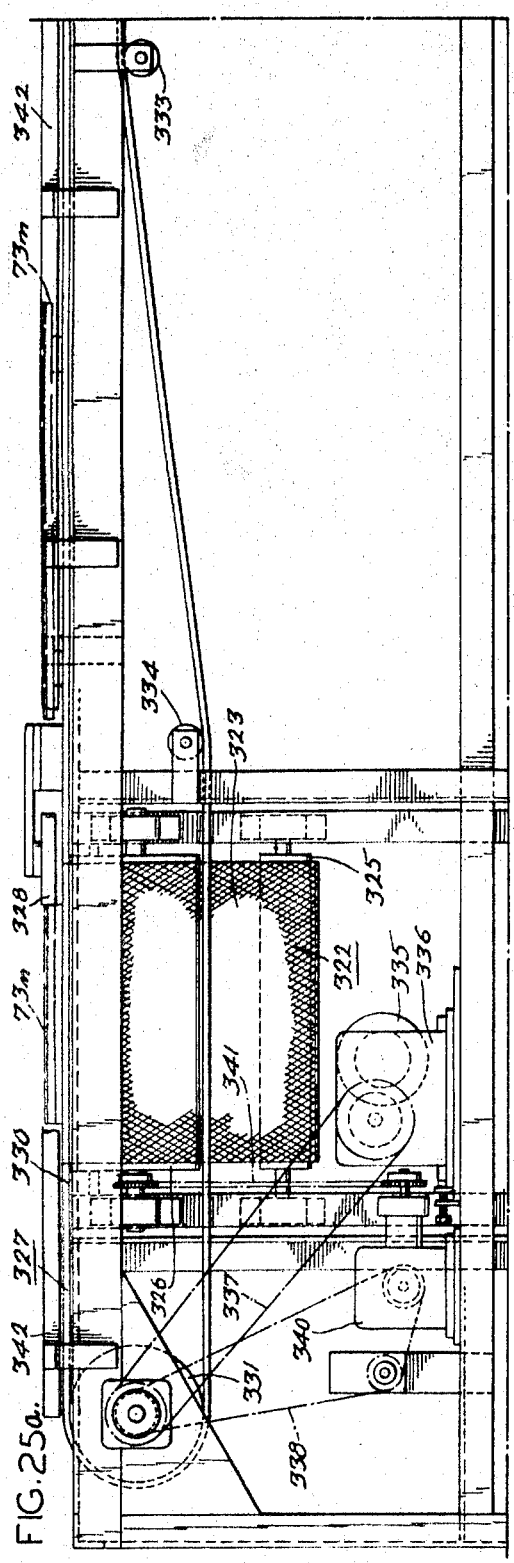
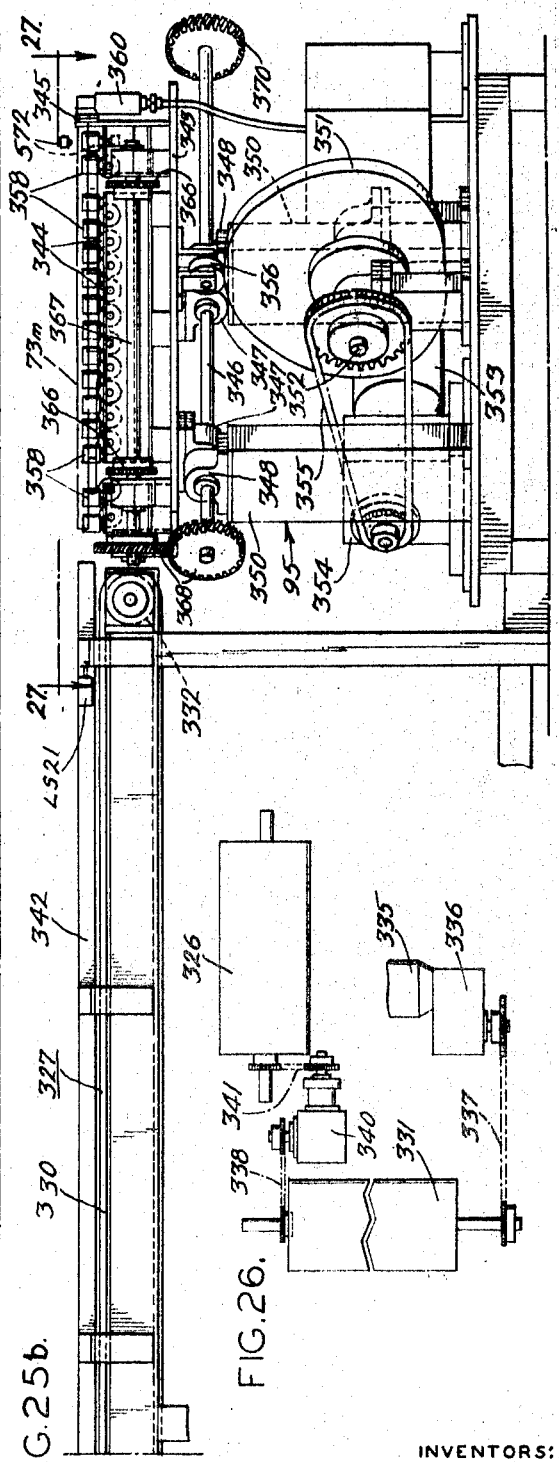
INVENTORS:
MALCOLM A. SCHWEIKER
WAYNE C. WATSON
BY
Howson & Howson
ATTYS.

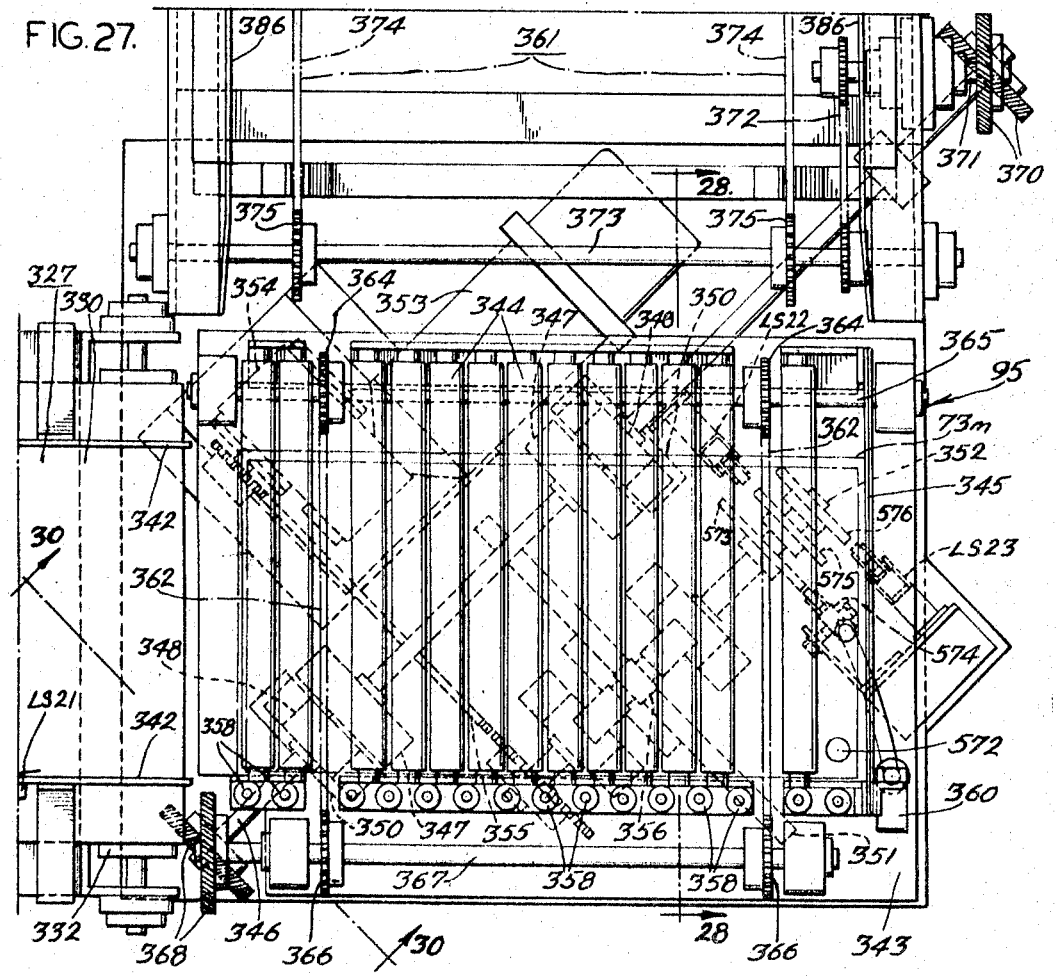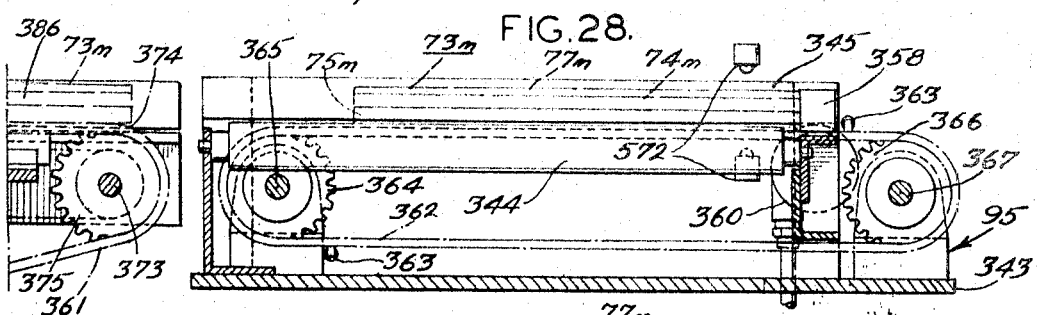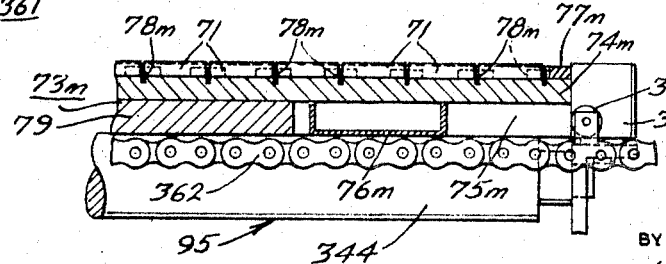

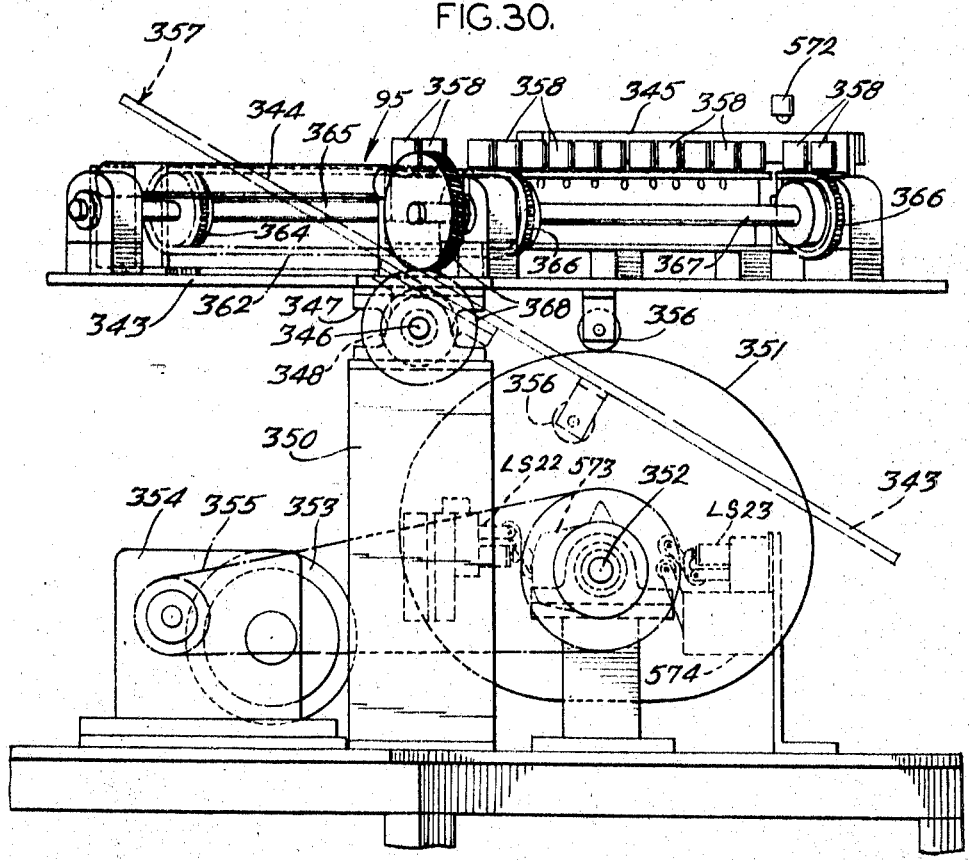
FIG. 30.
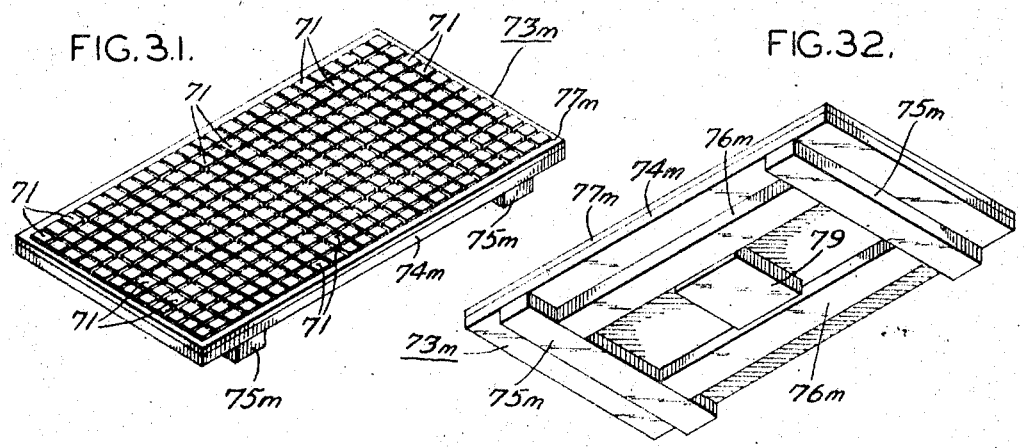
FIG. 31.
FIG. 32.
INVENTORS:
MALCOLM A. SCHWEIKER
WAYNE C. WATSON
BY
Howson & Howson
ATTYS.

INVENTORS:
MALCOLM A. SCHWEIKER
WAYNE C. WATSON
BY
Howson & Howson
ATTYS.

INVENTORS:
MALCOLM A. SCHWEIKER
WAYNE C. WATSON
BY Howson & Howson
ATTYS.

Aug. 26, 1969  M. A. SCHWEIKER ETAL  3,463,695
APPARATUS FOR PRODUCING CERAMIC TILE ASSEMBLIES
Filed June 23, 1966  26 Sheets-Sheet 19
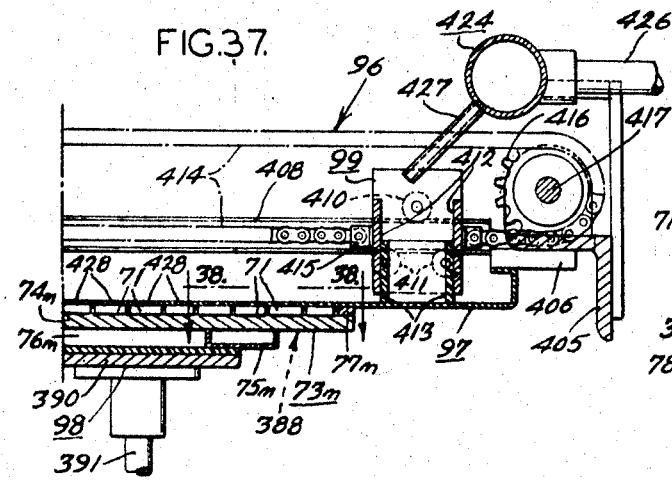
INVENTORS:
MALCOLM A. SCHWEIKER
WAYNE C. WATSON
BY
Howson & Howson
ATTYS.

INVENTORS:
MALCOLM A. SCHWEIKER
WAYNE C. WATSON
BY Howson & Howson
ATTYS.

Aug. 26, 1969  M. A. SCHWEIKER ET AL  3,463,695
APPARATUS FOR PRODUCING CERAMIC TILE ASSEMBLIES
Filed June 23, 1966  26 Sheets-Sheet 22

INVENTORS:
MALCOLM A. SCHWEIKER
WAYNE C. WATSON
BY
Howson & Howson
ATTYS.

Aug. 26, 1969     M. A. SCHWEIKER ETAL     3,463,695
APPARATUS FOR PRODUCING CERAMIC TILE ASSEMBLIES
Filed June 23, 1966     26 Sheets-Sheet 24

INVENTORS:
MALCOLM A. SCHWEIKER
WAYNE C. WATSON
BY
Howson & Howson
ATTYS.

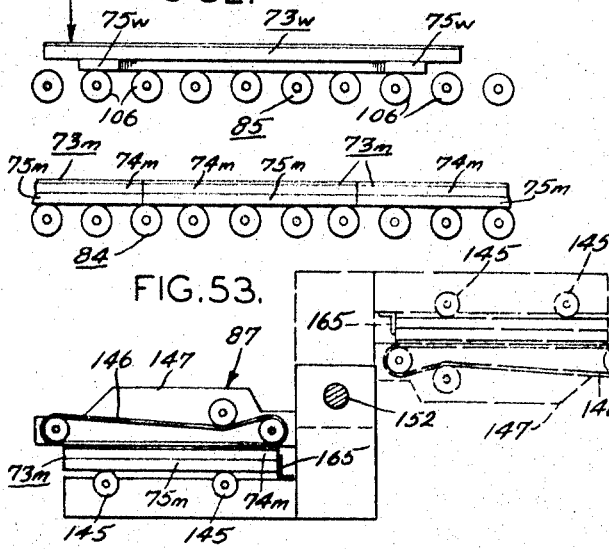
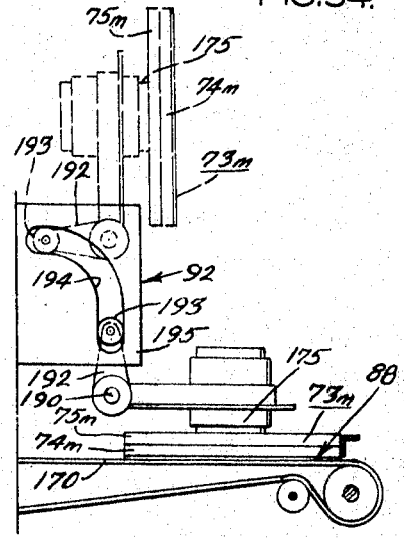
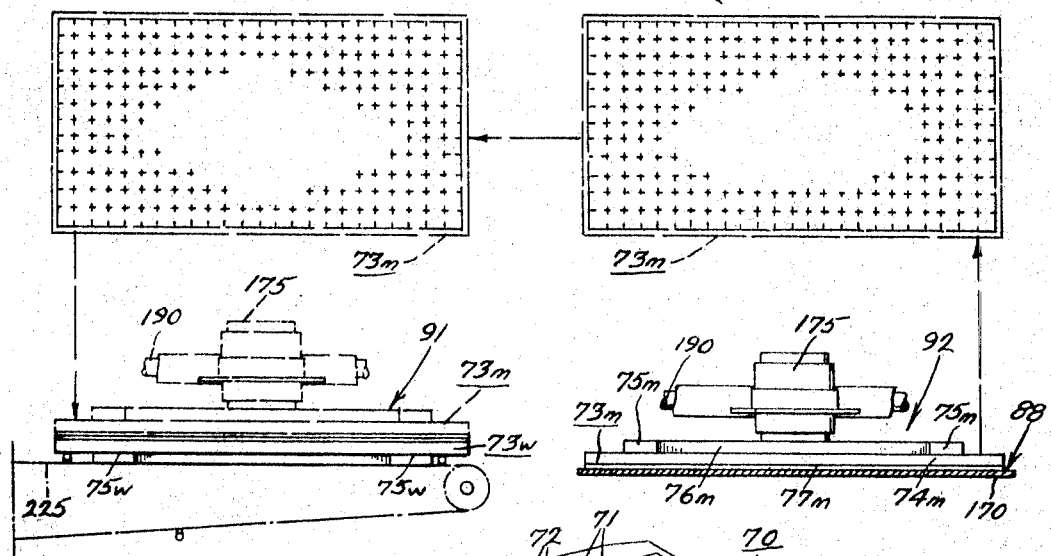
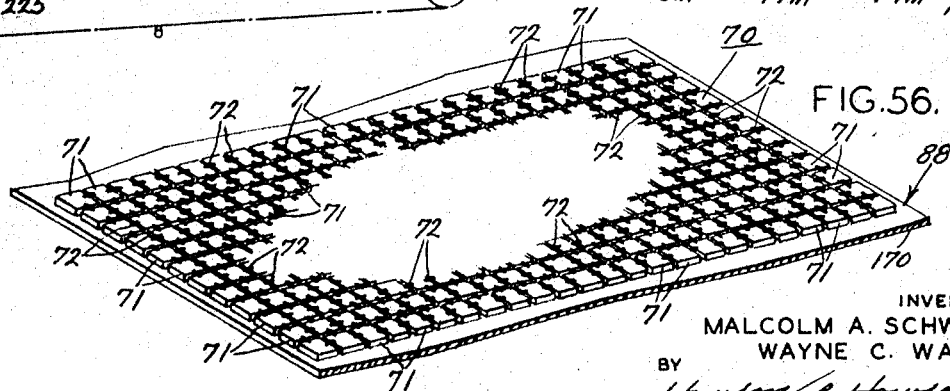
INVENTORS:
MALCOLM A. SCHWEIKER
WAYNE C. WATSON Aug. 26, 1969   M. A. SCHWEIKER ETAL   3,463,695
APPARATUS FOR PRODUCING CERAMIC TILE ASSEMBLIES
Filed June 23, 1966   26 Sheets-Sheet 26
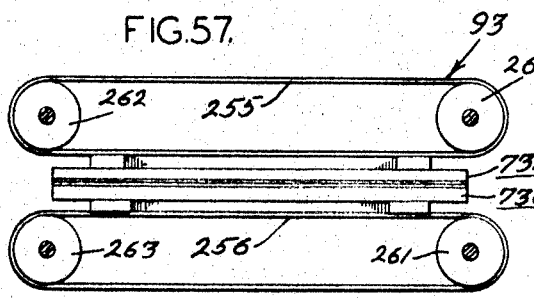
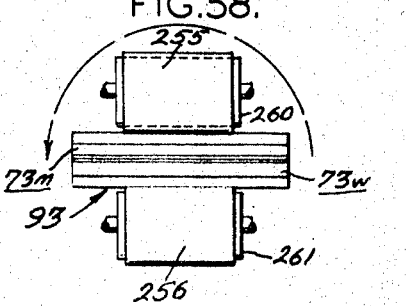
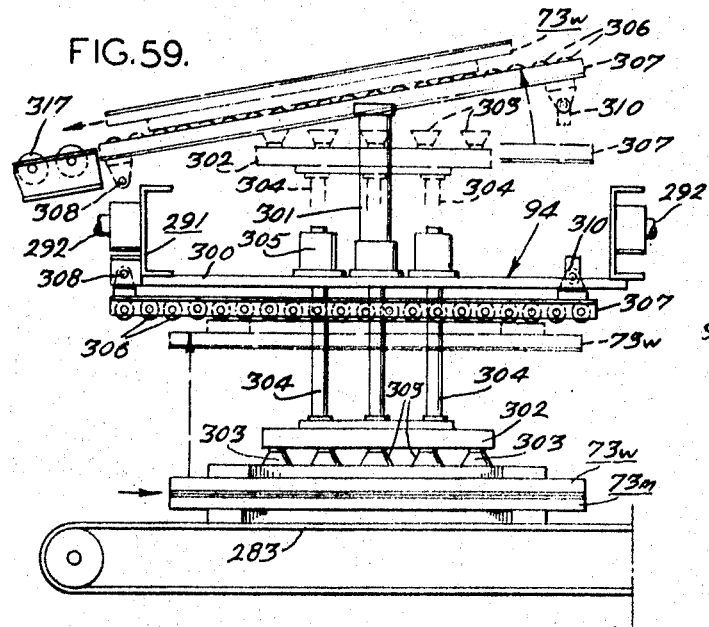
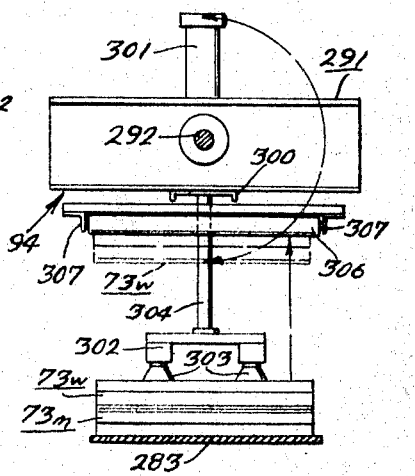
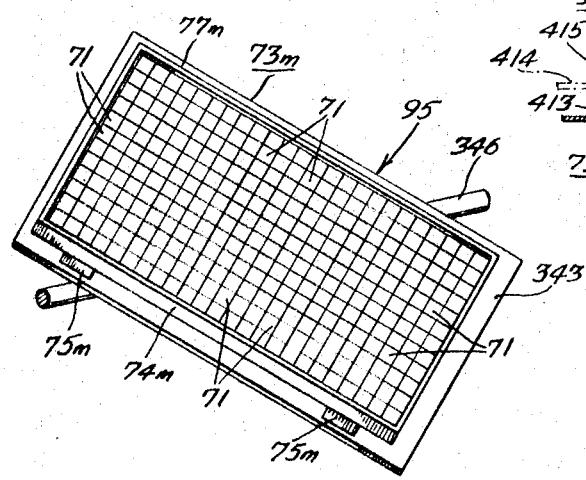
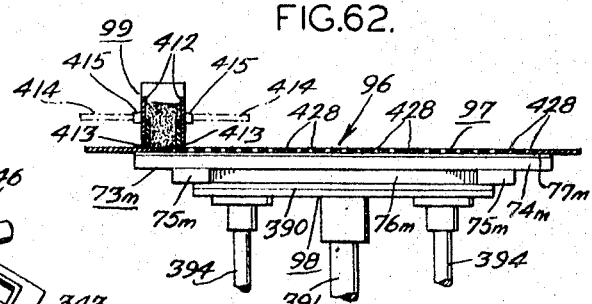
INVENTORS:
MALCOLM A. SCHWEIKER
WAYNE C. WATSON
BY Howson & Howson
ATTYS.

United States Patent Office 3,463,695
Patented Aug. 26, 1969

3,463,695
APPARATUS FOR PRODUCING CERAMIC TILE ASSEMBLIES
Malcolm A. Schweiker, Worcester, and Wayne C. Watson, Ambler, Pa., assignors to American Olean Tile Company, Inc., Lansdale, Pa., a corporation of New York
Filed June 23, 1966, Ser. No. 559,999
Int. Cl. B65h 29/24, 9/08
U.S. Cl. 156—556                           25 Claims

ABSTRACT OF THE DISCLOSURE

Apparatus for producing ceramic tile assemblies including means for filling the pockets of a partitioned tray with tile elements, means for arranging the tile elements in the tray pockets in an aligned spaced orientations, and means for applying beads of a mastic adhesive to the back faces of the tile elements to connect the adjacent edges thereof.

---

The present invention relates to apparatus for the production of ceramic tile assemblies of the type which comprises a plurality of individual ceramic tile elements joined in spaced aligned relation by localized resilient adhesive deposits on the back faces thereof.

Until recently, ceramic tile assemblies conventionally included a paper supporting sheet glued to the front faces of the tile elements which served to maintain the elements in the proper spacing and alignment until the assembly had been set in place in cement. The paper sheet would then be soaked and removed and the spaces between the tiles filled with grouting. An improved type of tile assembly which has recently been developed eliminates the paper supporting sheet by utilizing beads of resilient adhesive applied to the back faces of the tile elements to connect the elements in spaced alignment while providing a desirable flexibility of the assembly. The adhesive-connected assembly may be quickly and easily installed by simply setting in cement and applying grouting in the spaces between the tiles.

The present invention is directed to an apparatus for producing such adhesively bonded tile assemblies, which apparatus includes means for transferring a set of ceramic tiles from a partitioned wooden tile tray into a similar metal tray, means for inclining and vibrating the filled metal tray to properly align and space the individual tile elements, means for applying the adhesive to the tiles, and means for heating and subsequently cooling the assemblies to cure the adhesive. These several operations are carried out in a completely automatic cycle by the present apparatus.

It is accordingly a primary object of the present invention to provide an apparatus for producing ceramic tile assemblies of the adhesive-bonded type.

A further object of the invention is to provide such an apparatus which includes means for aligning and spacing the individual ceramic tile elements prior to the application of adhesive thereto.

An additional object of the invention is to provide such an apparatus which includes means for automatically applying beads of adhesive to the back face edges of the individual tile elements in the proper orientation.

A still further object of the invention is to provide an apparatus as described for producing ceramic tile assemblies which includes heating and cooling means for curing the applied adhesive.

Another object of the invention is to provide such an apparatus which is adapted to receive wooden trays filled with an array of tile elements, which array of elements is automatically transferred to a metal tray for passage through the several stations of the apparatus.

Still another object of the invention is to provide an apparatus of the type described, the adhesive applying means of which includes a self-cleaning arrangement to prevent the buildup or dripping of adhesive and to insure an accurate application of adhesive to the assemblies.

Additional objects and advantages of the invention will be more readily apparent from the following detailed description of an embodiment thereof when taken together with the accompanying drawings in which:

FIGS. 1a and 1b are a divided plan view of an apparatus for producing ceramic tile assemblies in accordance with the present invention;

FIGS. 2a and 2b are a divided side elevational view of the apparatus shown in FIGS. 1a and 1b;

FIG. 3a is a view taken along line 3a—3a of FIG. 1a showing the tray conveyor drive arrangement;

FIG. 3 is a view taken along line 3—3 of FIG. 2b showing in a plan view a portion of the vertically spaced tray conveyors at the tray loading station;

FIG. 4 is a sectional side elevational view taken along line 4—4 of FIG. 3;

FIG. 5 is a view taken along line 5—5 of FIG. 4 showing in further detail the preferred type of tray conveyor;

FIG. 6 is a view taken along line 6—6 FIG. 5 showing details of the conveyor;

FIG. 7 is a view similar to FIG. 6 showing the conveyor in the stopped position;

FIG. 8 is a view taken along line 8—8 of FIG. 2b showing the tray flipover and liftoff mechanisms, the wooden tray return conveyor being removed for clarity;

FIG. 9 is a view taken along line 9—9 of FIG. 8 showing the tray flipover and liftoff mechanisms in elevation;

FIG. 10 is a view taken along line 10—10 of FIG. 9 showing an end view of the liftoff mechanism;

FIG. 11 is a view taken along line 11—11 of FIG. 8 showing in an enlarged view the details of the tray liftoff mechanism;

FIG. 12 is an enlarged view of the liftoff mechanism taken along line 12—12 of FIG. 8;

FIG. 13 is a view taken along line 13—13 of FIG. 8 showing the tray liftoff and doubleup mechanism in the position shown in broken lines in FIG. 8 for depositing a metal tray upon a tile filled wooden tray;

FIG. 14 is a view taken along line 14—14 of FIG. 8 showing the conveyor mechanism for advancing the wooden tile filled trays into the doubleup station;

FIG. 17 is a plan view taken along the area designated in FIG. 1b showing the conveyor for advancing the doubled-up trays from the tray doubleup station to the tray separating station;

FIG. 18 is an elevational view of the conveyor mechanism shown in FIG. 17;

FIG. 19 is a view taken along line 19—19 of FIG. 17;

FIG. 20 is a view taken along line 20—20 of FIG. 2b showing in end elevation the tray rollover mechanism;

Figure 33:
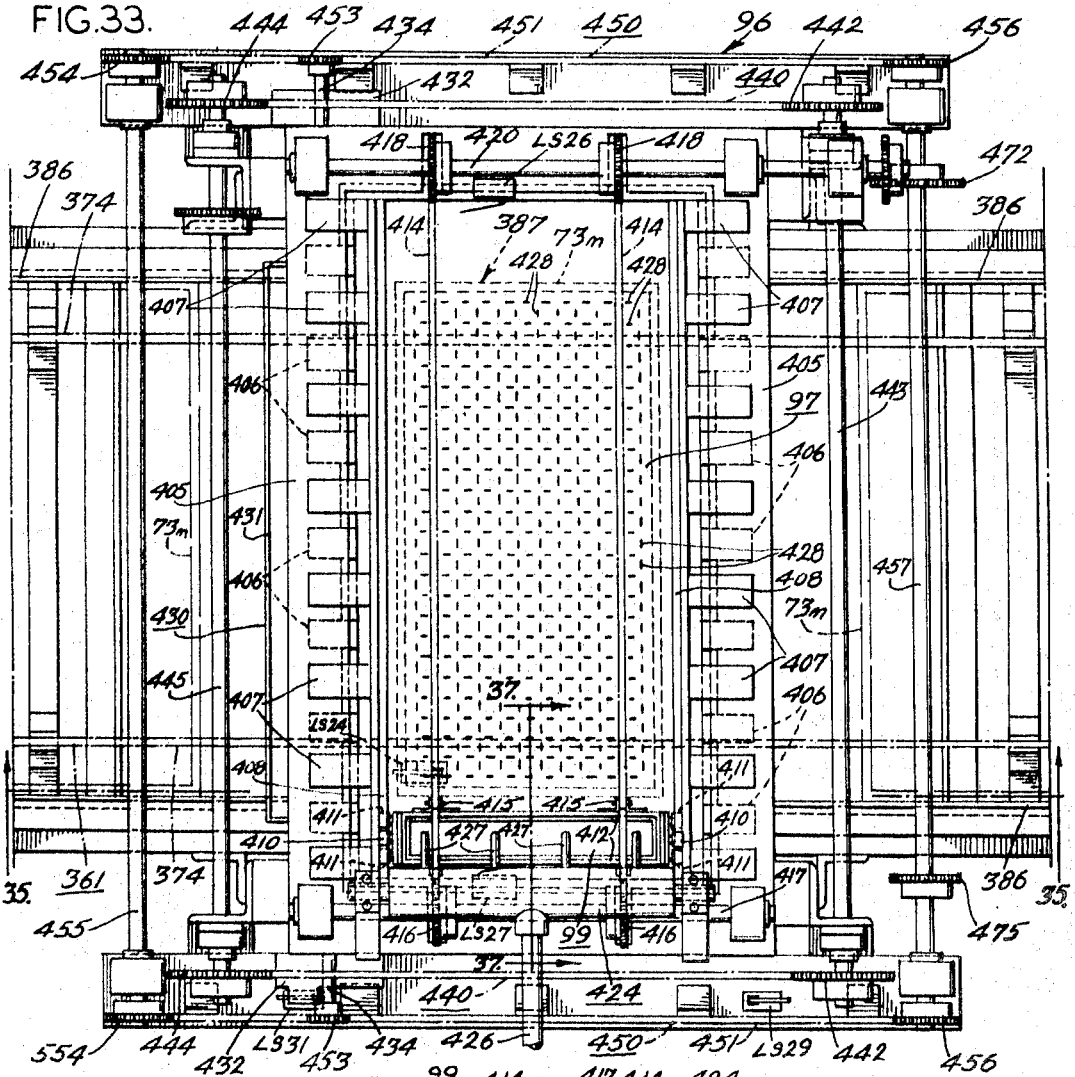
Figure 34:
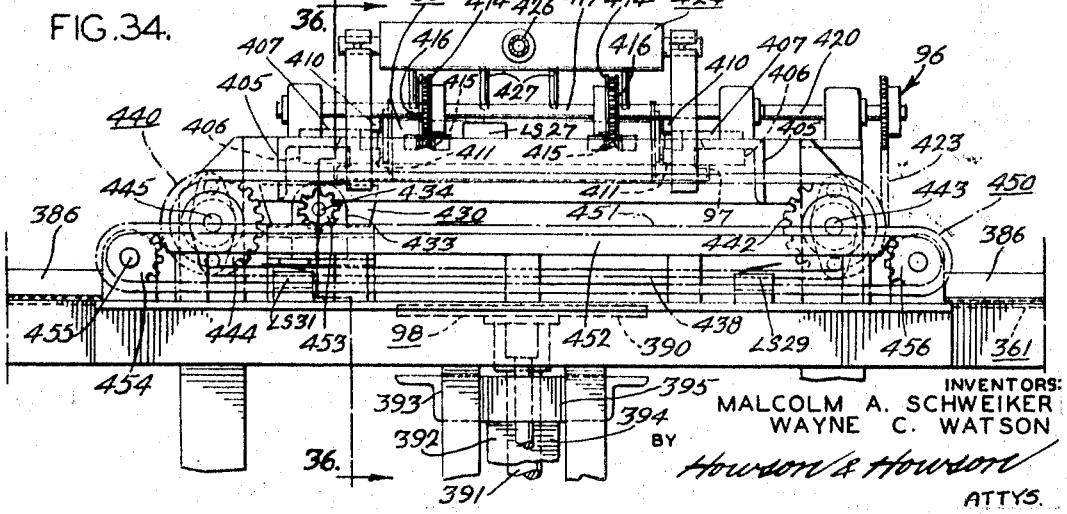
Figure 35:
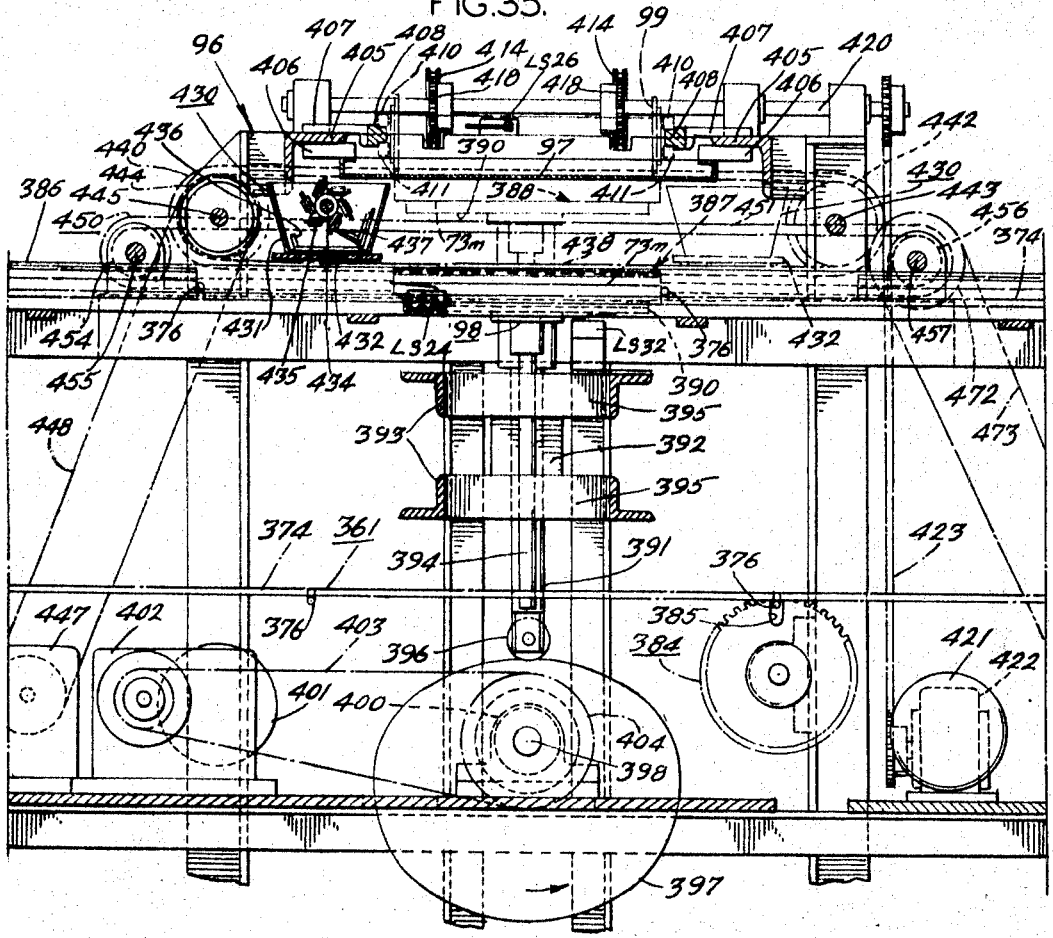
Figure 36:
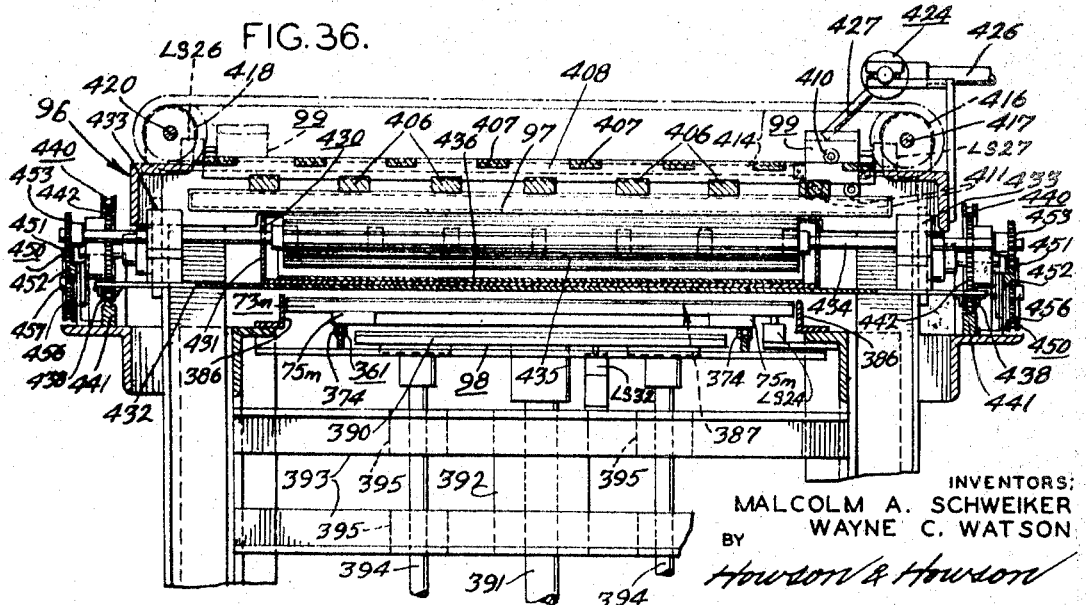
Figure 41:
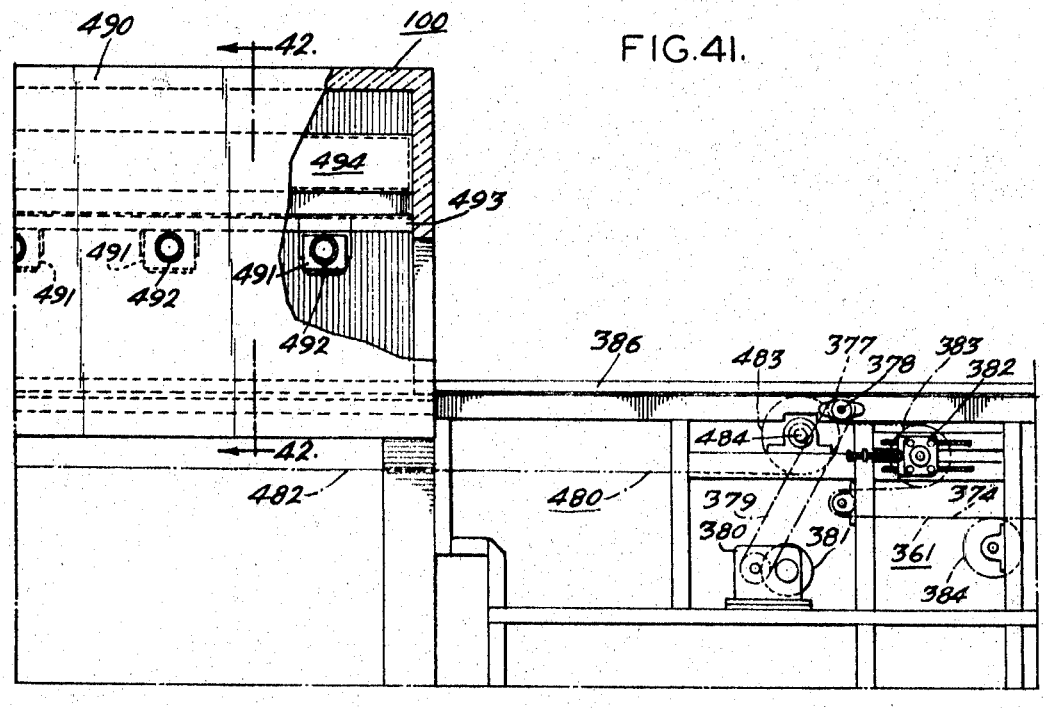
Figure 42:
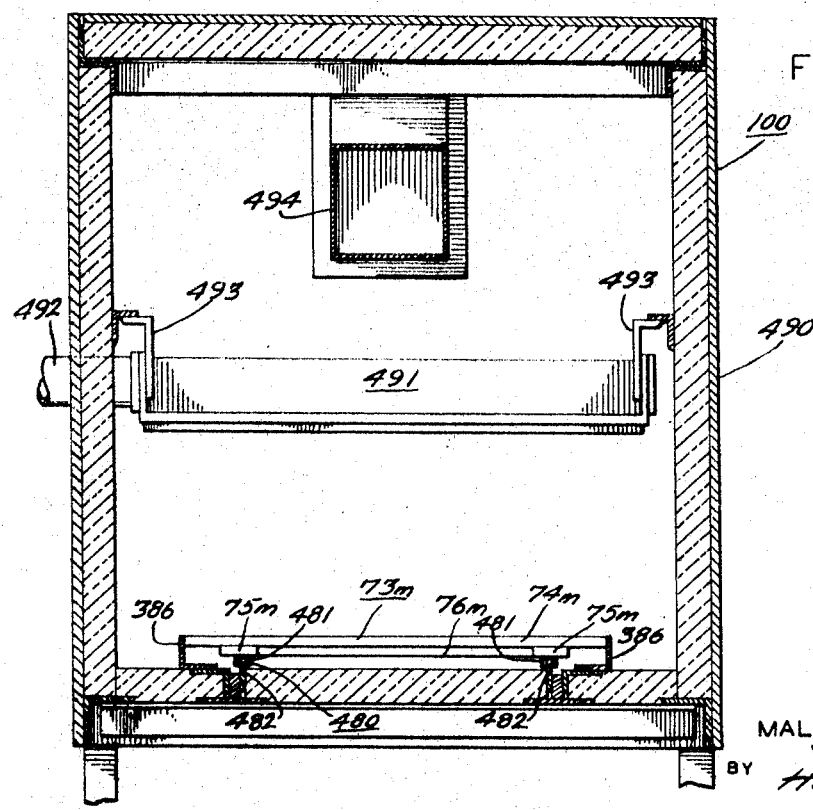
Figure 43:
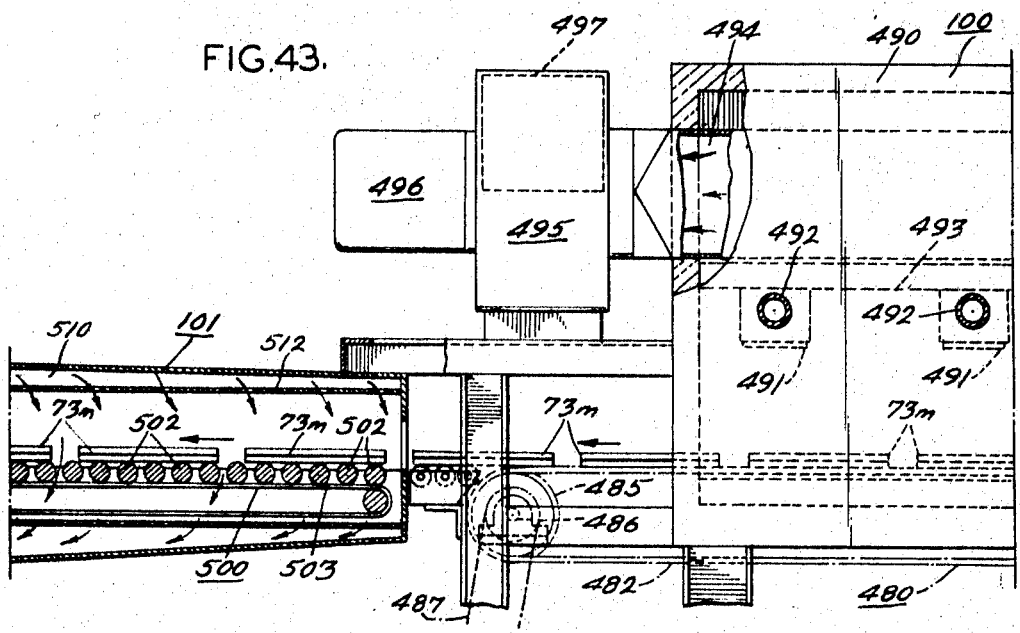
Figure 44:
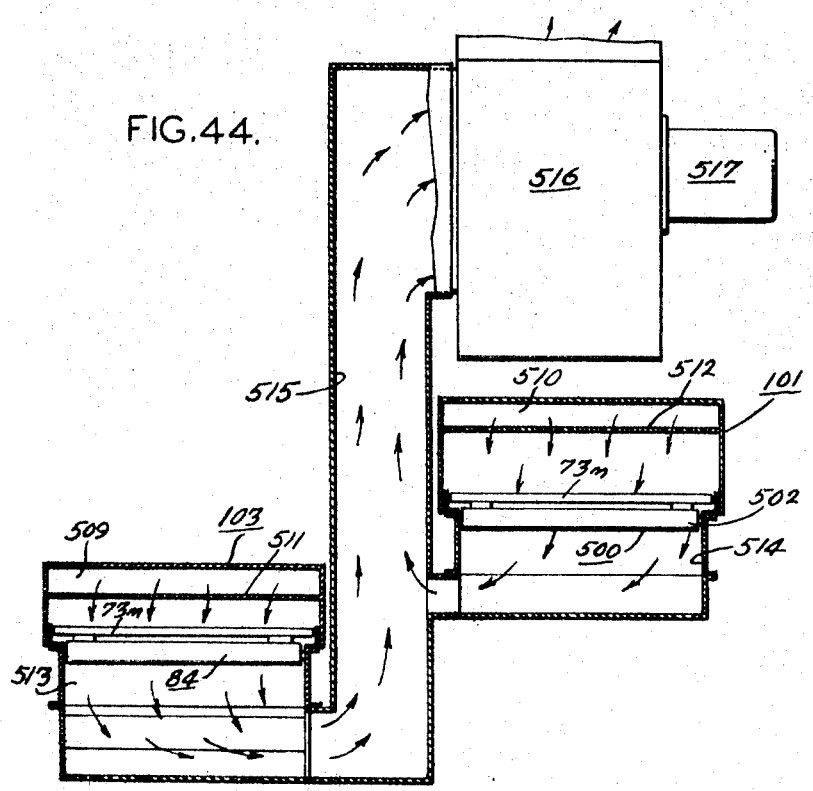
Figure 45:
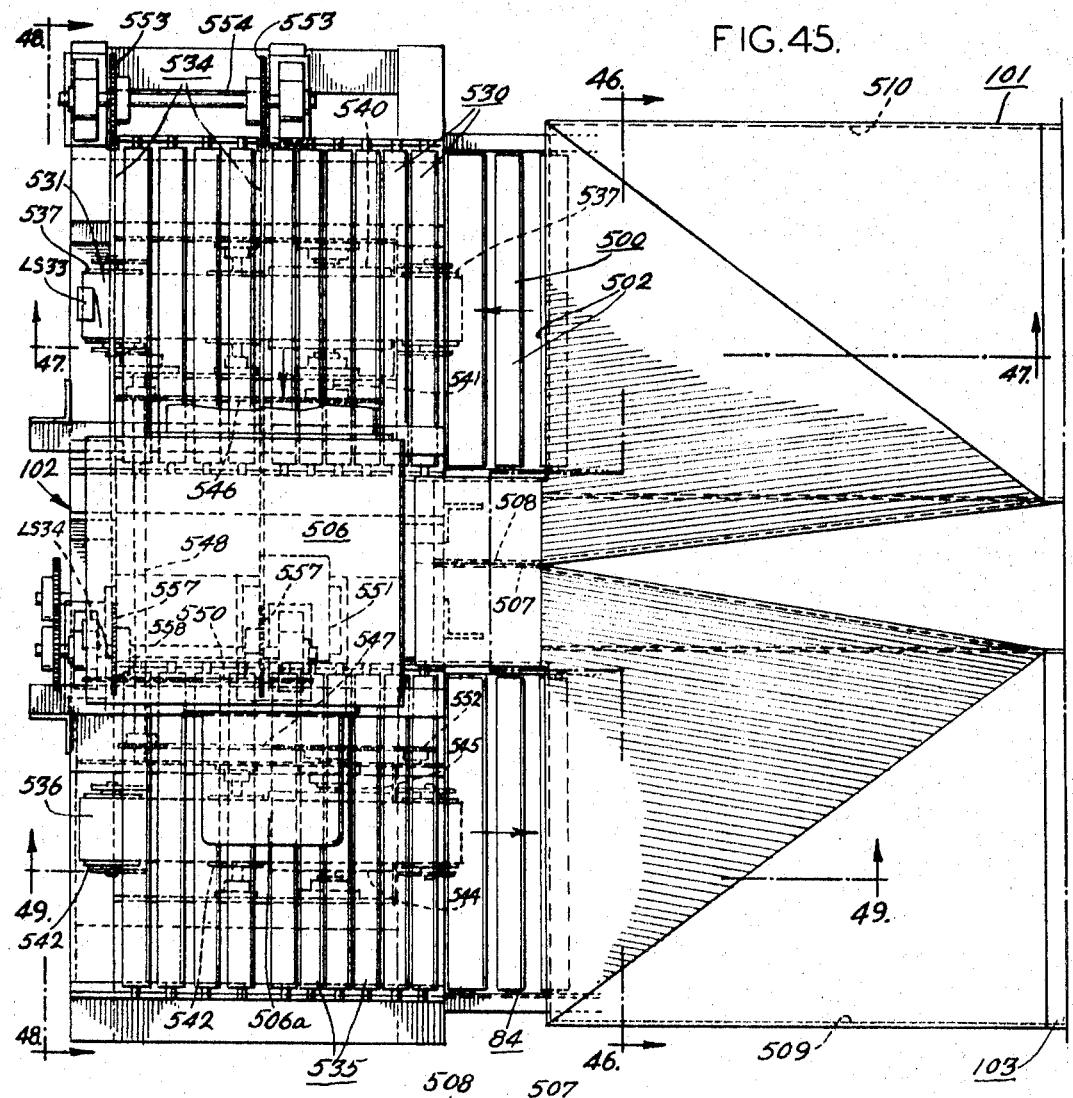
Figure 46:
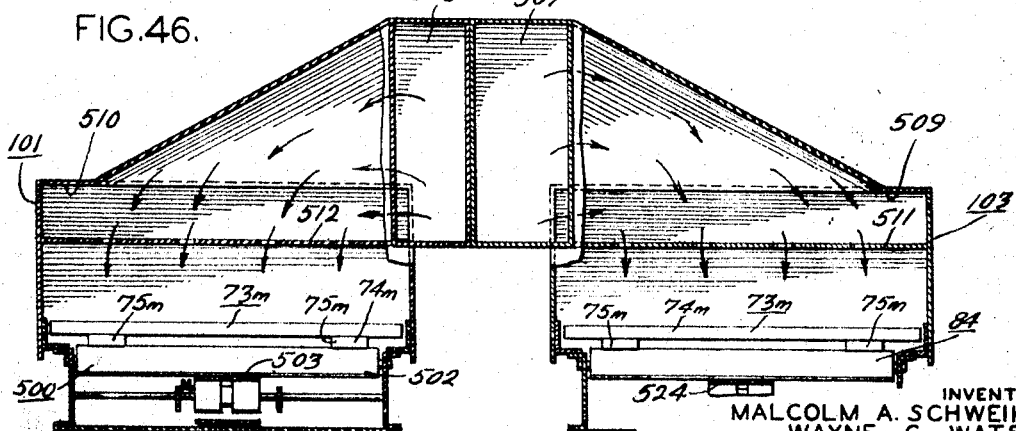
Figure 47:
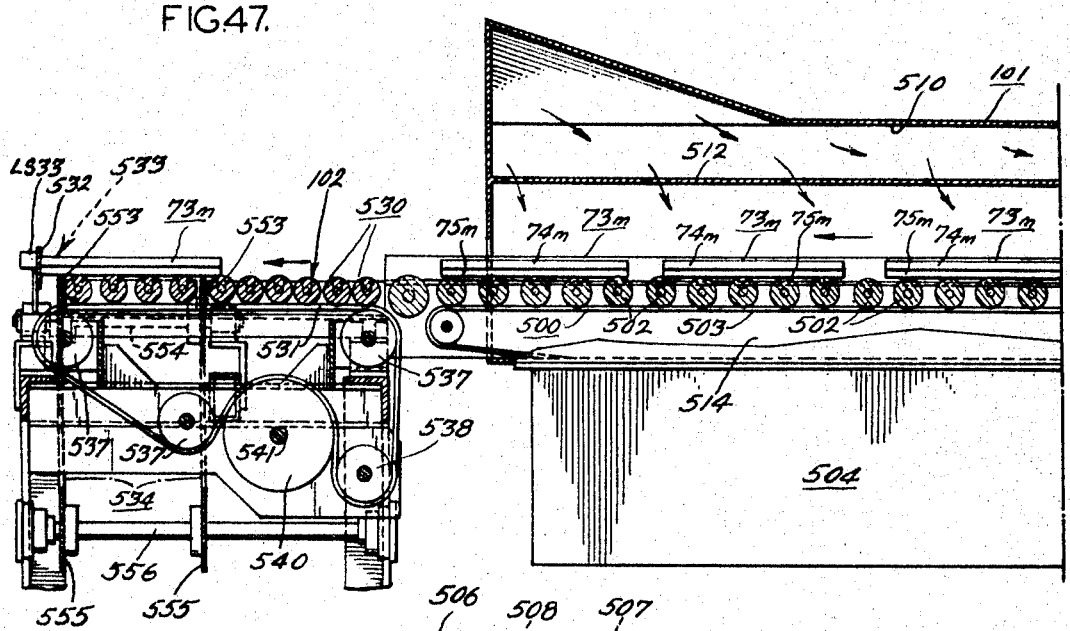
Figure 48:
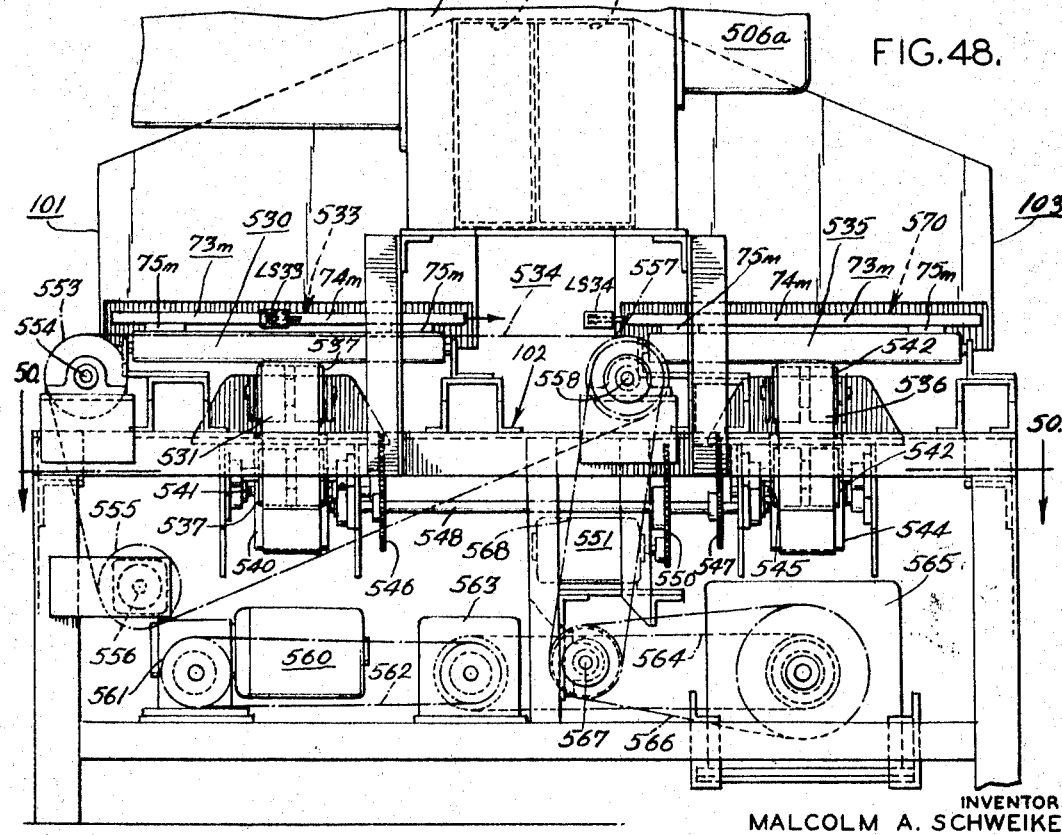
Figure 49:
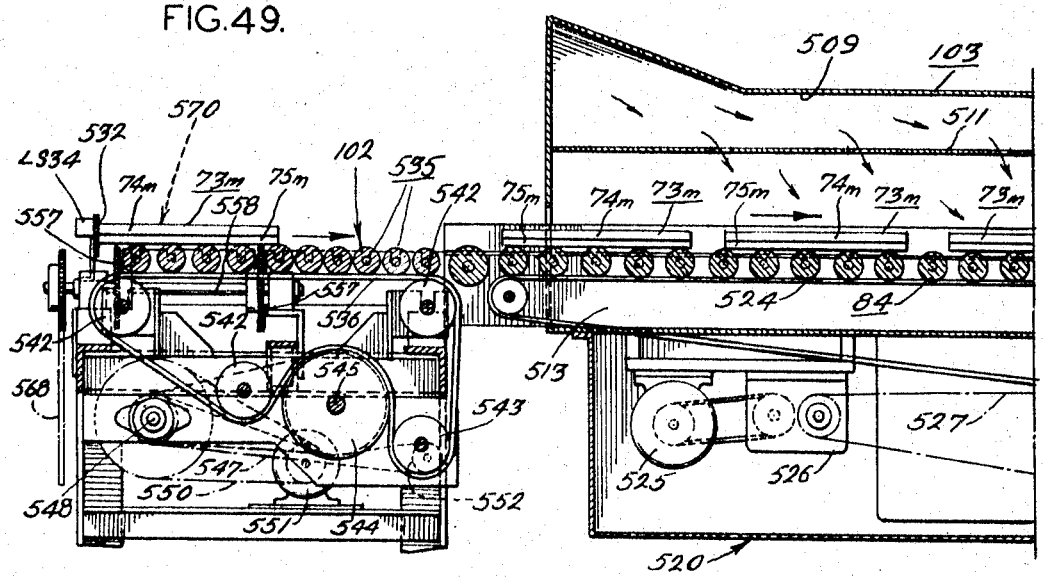
Figure 50:
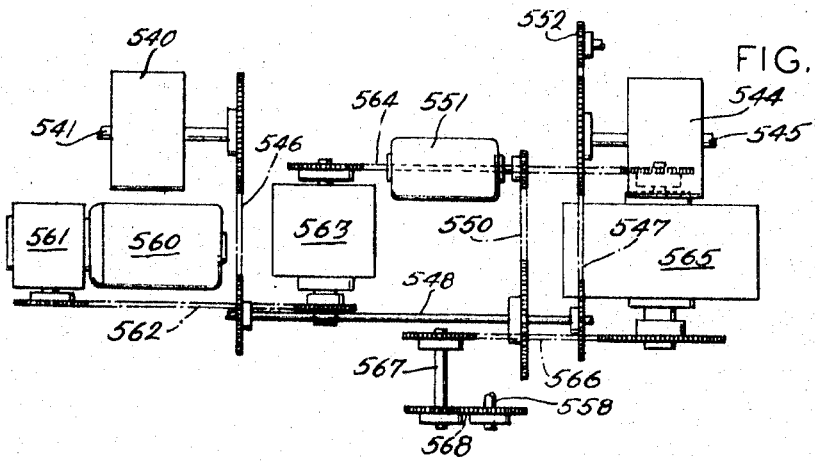
Figure 51:
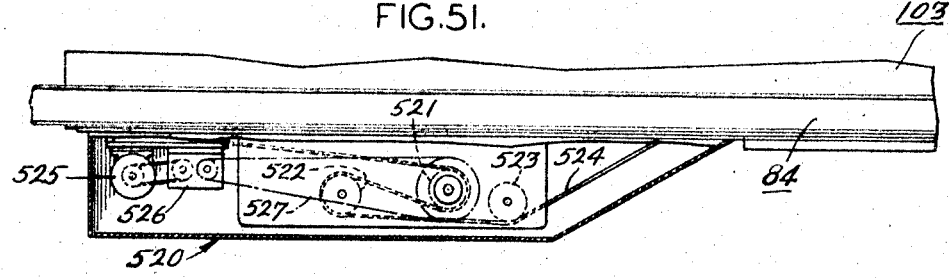

FIGS. 25a and 25b are elevational views taken respectively along lines 25a—25a and 25b—25b of FIG. 1b showing the tray conveyor leading into the tray tilt unit;

FIG. 26 is a schematic plan view of the conveyor drive mechanism shown in elevation in FIG. 25a;

FIG. 27 is a plan view taken along line 27—27 of FIG. 25b showing the tray tilt unit and a portion of the adjoining conveyor;

FIG. 28 is a view taken along line 28—28 of FIG. 27;

FIG. 29 is an enlarged view showing details of the tray advance means on the tilt unit;

FIG. 30 is a view taken along line 30—30 of FIG. 27 showing the tilt unit in broken lines in the tilted position;

FIG. 31 is a perspective view showing a partitioned metal tray filled with ceramic tiles in spaced aligned condition following alignment in the tilt unit;

FIG. 32 is a perspective view of a metal tray of the type shown in FIG. 31 showing the construction of the underside thereof;

FIG. 33 is a plan view of the adhesive applicator;

FIG. 34 is a side elevational view of the adhesive applicator shown in FIG. 33;

FIG. 35 is a view taken along line 35—35 of FIG. 33 showing details of the adhesive applicator;

FIG. 36 is a view taken along line 36—36 of FIG. 34;

FIG. 37 is a view taken along line 37—37 of FIG. 33 showing details of the adhesive reservoir;

FIG. 38 is an enlarged view taken along line 38—38 of FIG. 37 showing the perforated screen following passage thereover of the adhesive reservoir and broken away to show the beads of adhesive applied to the rear face edges of the tile elements;

FIG. 39 is an enlarged view taken along line 39—39 of FIG. 38 showing the manner in which the adhesive beads pass through the screen onto the tile surfaces;

FIG. 40 is a schematic plan view showing the drive mechanism for the adhesive applicator;

FIG. 41 is a view taken along line 41—41 of FIG. 1b showing in side elevation the conveyor leading from the adhesive applicator into the dryer;

FIG. 42 is a view taken along line 42—42 of FIG. 41 showing a cross-section of the dryer;

FIG. 43 is a view partly in section taken along line 43—43 of FIG. 1a showing the discharge end of the dryer and a portion of the cooling duct;

FIG. 44 is a sectional view taken along line 44—44 of FIG. 1a showing a cross-section of the cooling ducts and the exhaust system therefor;

FIG. 45 is a plan view taken along line 45—45 of FIG. 2a showing the tray crossover conveyor;

FIG. 46 is a sectional view taken along line 46—46 of FIG. 45 showing the cooling air intake duct arrangement;

FIG. 47 is a sectional view taken along line 47—47 of FIG. 45 showing details of the cooling duct and the tray crossover conveyor;

FIG. 48 is a view taken along line 48—48 of FIG. 45 showing the crossover conveyor in end elevation;

FIG. 49 is a sectional view taken along line 49—49 of FIG. 45 showing further details of the crossover conveyor;

FIG. 50 is a schematic plan view taken along line 50—50 of FIG. 48 showing the drive arrangement for the crossover conveyor;

FIG. 51 is a view taken along line 51—51 of FIG. 1a with portions broken away to show the cooling duct conveyor drive mechanism;

FIG. 52 is a schematic side elevational view taken at the tray loading station as indicated in FIG. 1b and showing the relative positions of the loaded wooden trays and the finished filled metal trays on the conveyors at the tray loading station;

FIG. 53 is a schematic elevational view taken as indicated in FIG. 1b and showing the operation of the metal tray flipover unit;

FIG. 54 is similarly a schematic view taken as indicated in FIG. 1b showing inside elevation the metal tray liftoff mechanism;

FIG. 55 is a schematic end view of the tray liftoff and doubleup operation;

FIG. 56 is a perspective view showing the back side of the finished tile assembly;

FIG. 57 is a schematic side elevational view taken as indicated at 57 on FIG. 1b showing the doubled-up tile trays in the rollover mechanism;

FIG. 58 is a schematic end view of the rollover mechanism indicating the manner in which the transfer of the tile elements is accomplished by inversion of the doubled-up trays;

FIG. 59 is a schematic elevational view taken at 59 in FIG. 1b showing the tray separating mechanism;

FIG. 60 is a schematic end view of the apparatus shown in FIG. 59 indicating the manner in which the wooden trays are elevated to the return position;

FIG. 61 is a schematic view taken as indicated at 61 in FIG. 1b showing a metal tray in the tilted position in the tilt unit; and FIG. 62 is a schematic sectional elevational view taken at 62 in FIG. 1b showing the manner in which the adhesive is applied to the back faces of the tiles in the adhesive applicator.

Referring to the drawings, a tile assembly 70 of the type produced by the present apparatus is shown in FIG. 56 and comprises a plurality of individual ceramic tile elements 71. For purposes of illustration, the assembly shown consists of 12 longitudinal rows and 24 transverse rows of spaced, aligned rectangular tile elements although it will be obvious that other tile arrangements and configurations could be assembled with minor modifications of the apparatus.

The individual tile elements 71 are joined by beads 72 of a resilient mastic adhesive which extend across the spaces between the tiles and link the back faces of the tiles in a flexible manner so that the tile assembly may be applied to non-planar wall surfaces. The localized adhesive beads, as may be seen more particularly by reference to FIGS. 38 and 39, are permitted to flow into the space between the adjoining tiles and serve both as a hinge permitting relative movement of adjoining tiles as well as spacing means to maintain the tiles in the proper spacing. Although in the illustrated embodiment a single bead of adhesive is applied across the spacing between adjoining tiles, it can be understood that for larger tile elements or elements of different shapes any desired arrangement of adhesive beads could be employed.

In the course of the several operations which are carried out in the present apparatus, the ceramic tiles are carried through the apparatus on a partitioned metal tray 73m, an example of which is shown in FIGS. 31 and 32. The construction of the metal tray 73m is practically identical with the well known wooden tile trays or boards such as shown for example in U.S. Patent 3,177,568, assigned with the present application to a common assignee. Since there is a heating step involved in drying the mastic adhesive, wooden trays could not suitably be used and metal trays, preferably of aluminum, are substituted for transporting the tiles to the various operating stations of the apparatus.

Although the metal tile trays could be filled automatically by a direct tile feeding machine such as that shown in the above cited U.S. Patent 3,177,568, in the illustrated embodiment of the invention an arrangement is provided for filling conventional wooden tile trays manually and placing the loaded wooden trays on the apparatus, whereupon the tiles are transferred automatically to the metal trays. Since the tile elements must be positioned in the metal trays face down so that the adhesive beads may be applied to the rear faces thereof, it is apparent that by first filling a wooden tray with the tiles face up, then transferring the tile array to a metal tray by placing the metal tray face to face with the wooden tray and inverting both trays, the final appearance of the assembly may be visually checked before processing. If a direct tile feeding unit were employed, the tiles would be fed directly into the metal trays and the appearance of the assembly could not be checked until assembly had been completed. The wooden trays are, in addition, lighter, permitting easier handling and are substantially less expensive than the metal trays.

The construction of the metal trays 73m and the wooden trays 73w is essentially the same, the trays with reference to the metal tray of FIGS. 31 and 32 including a rectangular body portion 74m beneath which are secured spaced transverse battens 75m and longitudinal battens 76m extending between the transverse battens. A peripheral border strip 77m defines the edges of the tile pockets which adjoin the tray edges, and thin metal partitions 78m which are clearly shown in FIGS. 11 and 12 establish the interior tile pockets. The metal trays differ from the wooden trays in that a ferrous block 79 is centrally fastened beneath the body portion 74m to permit magnetic pickup of the tray. This, of course, is necessary only if the tray is made of a non-ferrous material such as aluminum.

To provide an understanding of the operations carried out at the various stations of the apparatus, a brief description of the operations as schematically shown in FIGS. 52–62 will be presented with the stations at which such operations are carried out being indicated with respect to FIGS. 1a, 1b, 2a, and 2b. A plan view of an apparatus 80 embodying the present invention is shown in FIGS. 1a and 1b. Adjacent the apparatus are tray loading tables 81 attended by operators 82 who fill the wooden trays 73m with the desired selection of ceramic tile elements 71, the tile elements being placed face up in the trays. The operators 82 are positioned along the tray loading station 83 of the apparatus which, as shown in FIGS. 2a and 2b, includes three vertically spaced conveyors, the lowermost being the finished tile conveyor 84, the intermediate conveyor being the filled wooden tray conveyor 85 and the uppermost being the empty wooden tray conveyor 86. The finished tile trays on conveyor 84 are in an endwise position on the conveyor while the filled and empty wooden trays are in a sidewise position on their respective conveyors.

The filled wooden trays are placed, by the operators 82, on the conveyor 85 for travel from left to right as indicated, the metal trays with the finished tile assemblies also traveling from left to right on the conveyor 84. The metal trays pass from the conveyor 84 into the flipover unit 87 which, as schematically shown in FIG. 53, serves to invert the metal trays and advance the inverted trays to the inspection station 88 at which an operator 89 is positioned to inspect both the completed assemblies and the metal trays. The filled wooden trays are conveyed onto the indexing conveyor 90 which presents the trays to the doubleup station 91. As shown schematically in FIGS. 54 and 55, a liftoff and doubleup mechanism 92, by means of a magnetic pickup, lifts the metal trays from the finished assemblies at the inspection station 88 and transfers the metal trays in the proper registration face down onto the filled wooden tile trays at the doubleup station 91.

The doubled-up trays with the tiles sandwiched therebetween are conveyed to the rollover unit 93 schematically illustrated in FIGS. 57 and 58. As indicated the doubled-up trays are advanced between opposed belts and the belt units are then rotated 180° to invert the trays, permitting the tiles to drop from the wooden into the metal tray. The doubled-up trays are then advanced into the tray separating unit 94 wherein, as indicated schematically in FIGS. 59 and 60, the upper wooden tray is lifted by a vacuum unit from the metal tray. The wooden tray is righted and placed on a series of tray return conveyors which returns the empty tray to the wooden tray return conveyor 86 at the tray loading station, from which the empty trays are removed to the table 81 for refilling with tile elements.

From the tray separating unit 94 the metal trays containing the tile elements face down in the tile pockets are passed by conveyors into the tilt unit 95 wherein the tile tray is tilted as shown in FIG. 61 along an axis running diagonally across the tile tray so that the individual tiles drop into the corners of their respective tile pockets to provide a proper alignment and spacing of the tile elements. A vibrating unit is preferably employed in the tilt mechanism to insure the proper positioning of each element.

From the tilt unit the tile trays are conveyed into the adhesive applicator 96 in which the beads of adhesive are applied to the back faces of the tile elements. The manner in which this is carried out is shown in FIG. 62, the tile tray 73m being raised against a perforated screen 97 by a lift mechanism 98, following which a squeegee-equipped adhesive reservoir 99 is passed over the screen 97 to deposit adhesive beads passing through the perforated screen onto the back faces of the tile elements in a predetermined arrangement.

The tile trays are conveyed from the adhesive applicator 96 into the dryer 100 wherein the tile assemblies are subjected to elevated temperatures to cure the adhesive. The trays move from the dryer into the cooling duct 101, onto the crossover conveyor 102 and into the second cooling duct 103 through which they are conveyed on the previously described finished tile conveyor 84. As described above, the finished tile trays pass on the conveyor 84 into the flipover unit 87 and into the inspection station 88 wherein the trays are lifted from the finished tile assemblies. The operator 89 inspects the assemblies and places them in the cartons 104 which, when filled, are transferred on the conveyor 105 to the tile shipping or storage area.

With the foregoing general description in mind, the particular structure and operation of the apparatus will be considered, starting with the tile loading station 83 and considering the other stations of the apparatus in the sequence in which they are encountered by the tile trays.

The three vertically spaced conveyors 84, 85 and 86 of the tile loading station 83 are power driven roller conveyors of the automatic pressure type, those illustrated being manufactured by the Rapids-Standard Company Inc. of Grand Rapids, Mich., and sold under the trademark Rapistan. This type of conveyor is particularly well adapted to the present apparatus since it provides a powered advance of the tile trays only if the conveyor region ahead of the trays is unoccupied. The details of this type of conveyor will be briefly described with reference to FIGS. 3–7, FIG. 4 showing in side elevation the three conveyors with the tile trays thereon being indicated in broken lines. Since the three conveyors 84, 85 and 86 are nearly identical, only the details of conveyor 85 will be described.

With reference to FIGS. 3–7, the conveyor 85 is adapted to advance the trays 73w on the spaced, transverse conveyor rolls 106 having axles 107 mounted in slots on the spaced conveyor side frames 108. Extending beneath the rolls 106 and driven continuously in the reverse direction to the tray travel, to the left in FIG. 4, is the drive run 109 of the conveyor drive belt 110 which extends the full length of the conveyor, the return run 111 of the drive belt being spaced below the drive run 109.

The drive run 109 of the conveyor belt is urged upwardly into driving contact with the rolls 106 by the cam elements 112 which are rotatably supported thereabove on the cam shafts 113 extending between the spaced side frames 108. The cam elements are of a generally cylindrical shape except for a flat face 114 and are eccentrically weighted so that when the flat face 114 is directed upwardly as in FIG. 7, the cam elements will tend to rotate in cooperation with the drive run of the conveyor belt, which is clockwise in the view of FIG. 7. During normal operation of the conveyor, the rotating cam elements raise the drive run 109 of the conveyor belt into driving engagement with the rolls 106 and are prevented from stopping in the position shown in FIG. 7 with the flat face uppermost by the eccentric weighting of the rolls.

Every eighth roll of the conveyor is a pressure sensitive roll 115 mounted on the pivot arms 116 having pivots 117 on the frame members 108. A cross arm 118 extends horizontally between the lower ends of the pivot arms 116 from which extends a crank arm 120 at a point offset from the cam elements 112. The crank arm is connected to an actuator rod 121 which extends horizontally back almost to the previous pressure sensitive roll at which point a vertical arm 122 of the rod engages the slide 123 passing over the cam shafts beneath the set of rolls behind the previous pressure sensitive roll. The slide 123 rests on pin stop plates 124 supported by a bushing 125 on the cam shafts, the pin stop plates being of a length somewhat less than the diameter of the cam elements and being of a greater width than the slide so as to closely adjoin the cam elements. A pin 126 extending transversely from each cam element near the periphery of the cam clears the pin stop plate 124 when the pressure sensitive roll 115 connected to the slide is in its normal raised position such as shown in FIG. 5. However, when the weight of a tray depresses the pressure sensitive roll, the slide is moved horizontally and moves the connected pin stop plates into the position shown in FIG. 7 to stop the pins and the cam elements with the flat faces 114 facing upwardly, thus permitting the belt to drop from contact with the adjacent rolls 106. The eccentric weighting of the cam elements holds the elements in the position shown in FIG. 7 until the tray has moved off the pressure sensitive roll, permitting the roll to return to its usual raised position due to the weight of the pivot arm 116 and cross arm 118. Upon return of the pin stop plates to the position shown in FIG. 6, the eccentric weighting of the cam elements starts the rotation of the cam elements and once again urges the belt into driving contact with the rolls 106. The pressure sensitive rolls are spaced approximately one tray length apart so that the presence of a tray on a given pressure sensitive roll will act only to stop the driving of the rolls one tray length to the rear. The lead tray of a succession of trays is thus continually urged forward while the rolls beneath the immediately following trays are not driven until the lead tray has advanced. Trays may thus be accumulated on the conveyors to permit a desirable flexibility of operation of the apparatus.

Summarizing the tray flow in the tray loading station 83, as indicated in FIG. 4 the empty wooden trays return to the station on the upper conveyor 86, the trays advancing until the lead tray runs into the bulkhead 127 as shown in FIG. 3a. The succeeding trays butt against the lead tray and their supporting conveyor rolls are halted by operation of the conveyor mechanism as explained above. The filled wooden trays are placed on the intermediate level conveyor 85 by the operators 82 and are advanced to the right as indicated in FIG. 4. The metal trays bearing the finished tile assemblies are carried on the lowermost conveyor 84, advancing the tiles from the cooling air duct 103 to the right toward the inspection station 88.

The drive assembly 130 for the conveyors 85 and 86 is shown in FIG. 3a enclosed in the housing 131 at the left end of the conveyors and includes a motor 132 and gear reduction unit 133 connected by drive chain 134 to the drive pulley 135. The conveyor belt 110 passes over the drive pulley 135, snubber pulley 136 and take-up pulley 137 connected to the automatic spring take-up assembly 138 for controlling the belt tension. A second chain 140 drives the pulley 141 around which the drive belt of the conveyor 86 is passed, the drive belt also passing over the snubber pulley 142, and take-up pulley 143.

As shown in FIGS. 8 and 9, the metal trays 73m containing the finished tile assemblies pass from the conveyor 84 onto the belt assemblies 144 which extends into the flipover unit 87, specific details of which are shown in FIGS. 9, 10 and 11. The conveyor 144 is driven by motor 144m, reducer 144r and chain 144c as shown in FIG. 9. The trays are advanced onto the rollers 145 spaced below the belt conveyor 146 on the pivotally mounted flipover frame 147, the conveyors 144 and 146 being driven at the same speed. The conveyor 146 is driven by motor 148 coupled to the speed reducer 150 by means of the chain drive 151. The flipover frame 147 is mounted on a shaft 152 journaled in the spaced trunnions 153, the frame being adapted for rotation through 180° driven by the motor 154, gear reducer 155 and chain drive 156 passing over the drive sprocket 157 on the shaft 152. A counterweight 158 is provided to balance the weight of the flipover unit on the shaft 152.

Stops 160 on the flipover frame accurately align the flipover unit with the conveyor 144 in the tray receiving position of the unit by contacting the stop angles 161 on the support frame and also serve to stop rotation of the inverted unit upon contact with the support posts 162 as shown in FIG. 11. The rollers 145 are mounted on spring loaded assemblies 163 attached to the flipover frame which bias the supported tray against the conveyor 146, the tray engaging run of which is supported by bracker plate 164. The filled metal trays are advanced on the conveyor 144 onto the rollers 145 until the tray abuts the stop angle 165 on the flipover frame. With the loaded tray being resiliently held between the spring loaded rollers 145 and the conveyor 146, the motor 154 is actuated to rotate the gear 157 and the shaft 152 to rotate the filled tray 180°, the unit coming to rest at the position shown in broken lines at 166.

Following inversion of the filled tray by the flipover unit, the inverted tray and tile assembly are moved by the conveyor 146 onto the belt conveyor 170 of the inspection station 88, the tray and tiles being advanced to the position 171 against the stop 172 as shown in FIG. 12. The conveyor 170 is driven by the motor and reduction gear unit 173 through the chain drive 174.

Figure 15:
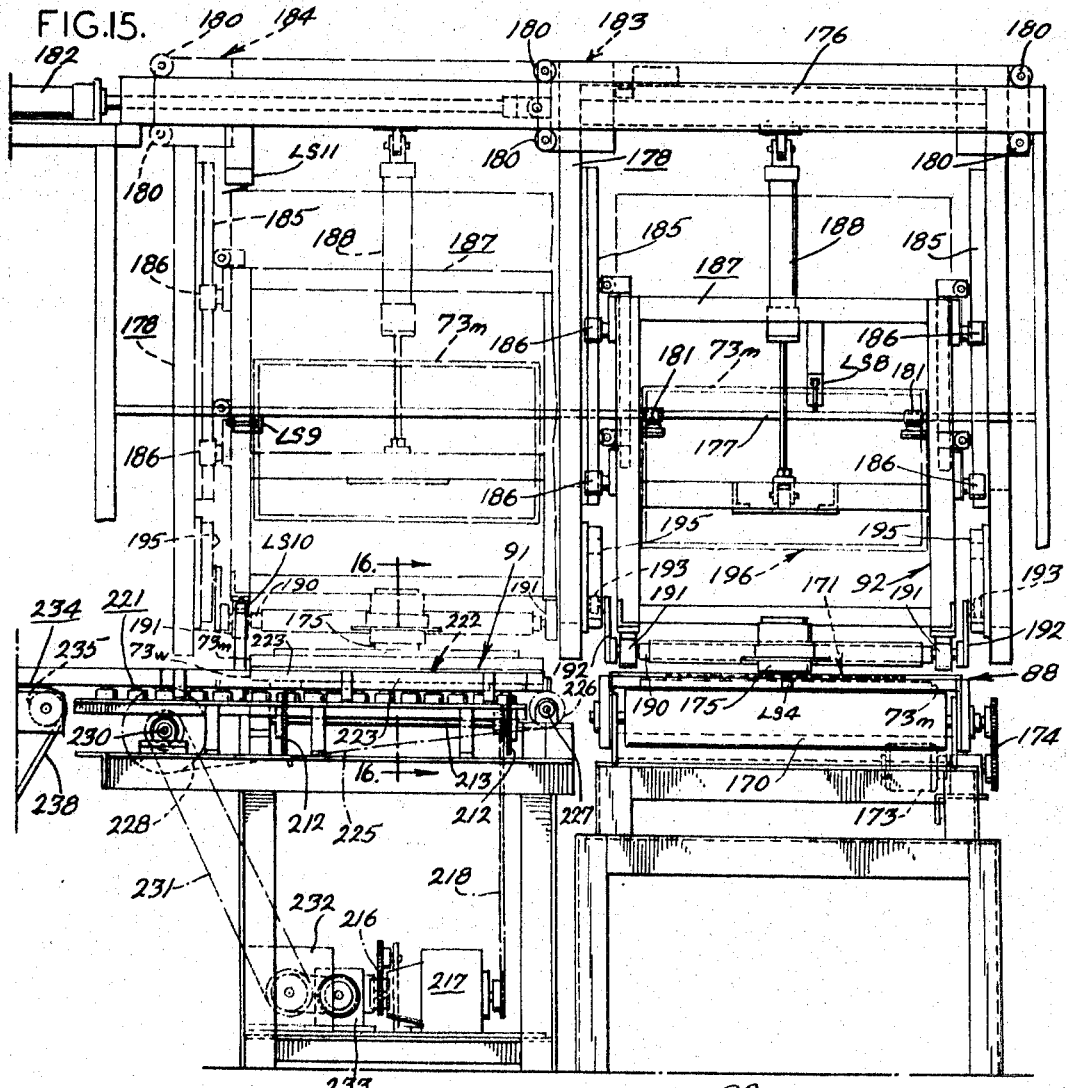
FIG. 15 is an end elevational view taken along line 15—15 of FIG. 8 showing the liftoff and doubleup mechanism in the tray liftoff position and, in broken lines, in the tray release position.

When the tray reaches the position 171, the lift-off and doubleup mechanism 82 is actuated to lower a magnet 175 into contact with the ferrous block 79 on the upwardly facing tray bottom to lift the tray from the finished tile assembly. The lift-off and doubleup mechanism is slidably suspended from the spaced overhead frame elements 176 in connection with the transverse support member 177 attached to suitable main frame members. The mechanism includes a horizontally movable carriage 178 which is slidably mounted on the frame elements 176 by the rollers 180 and suported on the transverse member 177 by the rollers 181. As shown in FIG. 15, the carriage 178 is horizontally positioned by the air cylinder 182 which is adapted to move the carriage from the position 183 over the inspection station shown in FIG. 15 to the position 184 over the doubleup station 91 shown in broken lines.

Slidably mounted on vertical tracks 185 of the horizontally movable carriage 178 by means of guide rollers 186 is a vertically movable carriage 187, the position of which is controlled by the air cylinder 188. The magnet 175 is rotatably mounted on the magnet pivot 190 journaled in the bearings 191 at the sides of the vertically movable frame 187. Arms 192 secured to the ends of the magnet pivot shaft 190 are provided with rollers 193 at the ends thereof which ride in the curved slots 194 of the plates 195 secured to the horizontally movable frame 178. Actuation of the air cylinder 188 to raise the vertically movable frame from the lowered position to the raised position indicated in dotted lines effects a rotation of the magnet pivot shaft due to the 90° rotation of the arms 192 by the travel of the rollers 193 along the curved slots 194. The raising of the vertically movable carriage thus causes the magnet to rotate 90° to bring the empty metal tile tray to a raised vertical position 196 at which the condition of the tray may be examined by the operator 89. If the tray condition is satisfactory, the air cylinder 182 is actuated moving the entire lift-off mechanism horizontally to the position 184 above the doubleup station.

The filled wooden trays, as indicated in FIG. 8, pass from the conveyor 85 onto the turnaround conveyor 200 aligned transversely therewith, and the conveyor 200 being a belt conveyor having a belt surface adapted to grip the trays and, in conjunction with the roller 201, turn the trays 90°. A suitable conveyor belt for this purpose is manufactured by the Goodyear Rubber Company under the conveyors 200 onto the gravity roll conveyor 202, the trays advancing on the rolls until reaching the stop 203 at the tray position 204 illustrated in FIG. 14.

The wooden trays are then advanced sideways from conveyor 202 on the transfer conveyor 205, being moved between the guides 206 thereof on the spaced conveyor chains 207. The chains are provided with spaced cogs 208 adapted to engage the transverse battens 75w of the trays. The chains pass over idler sprockets 210 on the shaft 211 adjacent the gravity roll conveyor 202 and, at the other end of the transverse conveyor, pass over the sprockets 212 keyed to shaft 213. Shaft 213 is driven by motor 214 acting through reducer 215, drive chain 216, transmission 217 and drive chain 218.

Figure 16:
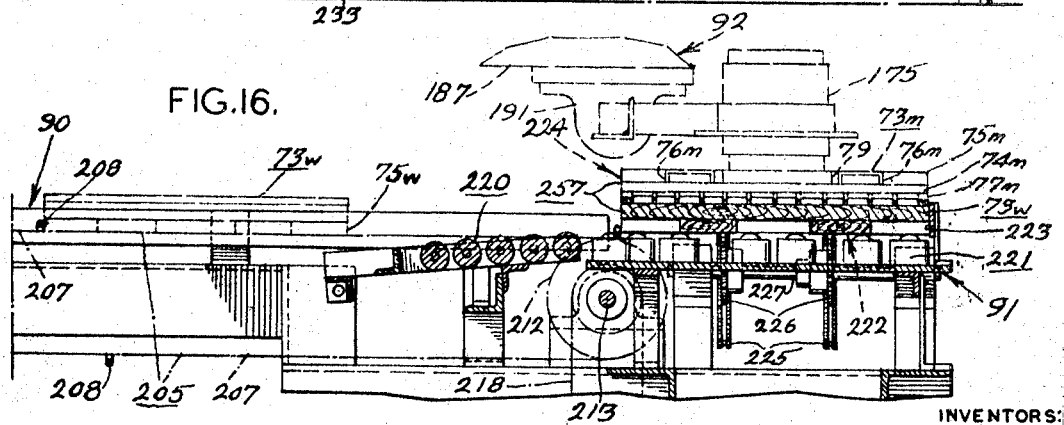
FIG. 16 is a sectional view taken along line 16—16 of FIG. 15.

The trays at the end of the transfer conveyor 205 pass over the inclined gravity roll conveyor 220 onto the ball transfers 221 of the doubleup station 91 as shown in FIG. 16. The trays are stopped in the doubleup position 222 by the stop plate 223, a tray in the position 222 being properly aligned for the doubleup operation indicated in broken lines in FIG. 16.

With the filled wooden tray in the position 222 at the doubleup station and the metal tray lift-off and doubleup mechanism 92 in the position 184 in the doubleup station, the air cylinder 188 is actuated to lower the vertically movable carriage 187 which, by action of the rollers 193 in the slots 194, causes the magnet 175 to be lowered to the horizontal position, the mechanism being so adjusted as to position the inverted empty metal tray in the position 224 as shown in FIG. 16 in broken lines in accurate registration with the filled wooden tray. The magnet power is then shut off and the lift-off and doubleup mechanism returned to the inspection station to pick up the succeding metal tray.

Following the raising of the magnet 175, the doubled-up tray assembly 257 is moved from the doubleup station on the ball transfers 221 by the lugged chains 225. The chains pass over the idler sprockets 226 on the shaft 227 at one side of the doubleup station and are driven by the drive sprockets 228 keyed to drive shaft 230 at the other end of the station. The drive shaft 230, as shown in FIG. 13, is driven by drive chain 231 connected with transmission 232 which is driven by means of the right angle drive unit 233 by the motor 214.

The doubled-up tray assembly is advanced by the lugged chains 225 onto the belt conveyor 234, the belt of which preferably has a tray gripping surface similar to the Wedgegrip belt described above. As shown most clearly in FIGS. 17–19, the conveyor 234 includes two parallel idler rolls 235 and 236 at the ends thereof and a larger drive roll 237 mounted on the frame therebelow around which the belt 238 travels in a triangular path. The drive roll 237 is driven by the motor 240 through the reducer 241, chain 242, miter gear box 243 and drive chain 244.

The doubled-up trays are advanced by the conveyor 234 onto the turning conveyor 245 which also is a belt type conveyor set at right angles to the conveyor 234 and having a conveyor belt 246 of the Wedgegrip type. The belt 246 passes around an idler roll 247 adjacent the rollover unit 93 and, at the other end of the conveyor, over a drive roll 248 which is also driven by the drive chain 242 from the motor 240 and reducer 241 as shown most clearly in FIG. 18. The doubled-up trays passing from the conveyor 234 onto the turning conveyor 245 are turned at a 90° angle by the frictional gripping characteristic of the conveyor belting in conjunction with the turning roller 250 positioned at the juncture of the two conveyors. A guide rail 251 extends from adjacent the doubleup station along the conveyor 234 and around the exterior of the doubleup tray path along the conveyor 245 to guide the doubled-up trays into the rollover unit 93 in conjunction with the guide rail 252 extending from the turning roll 250 to the end of the rollover conveyor.

Figure 21:
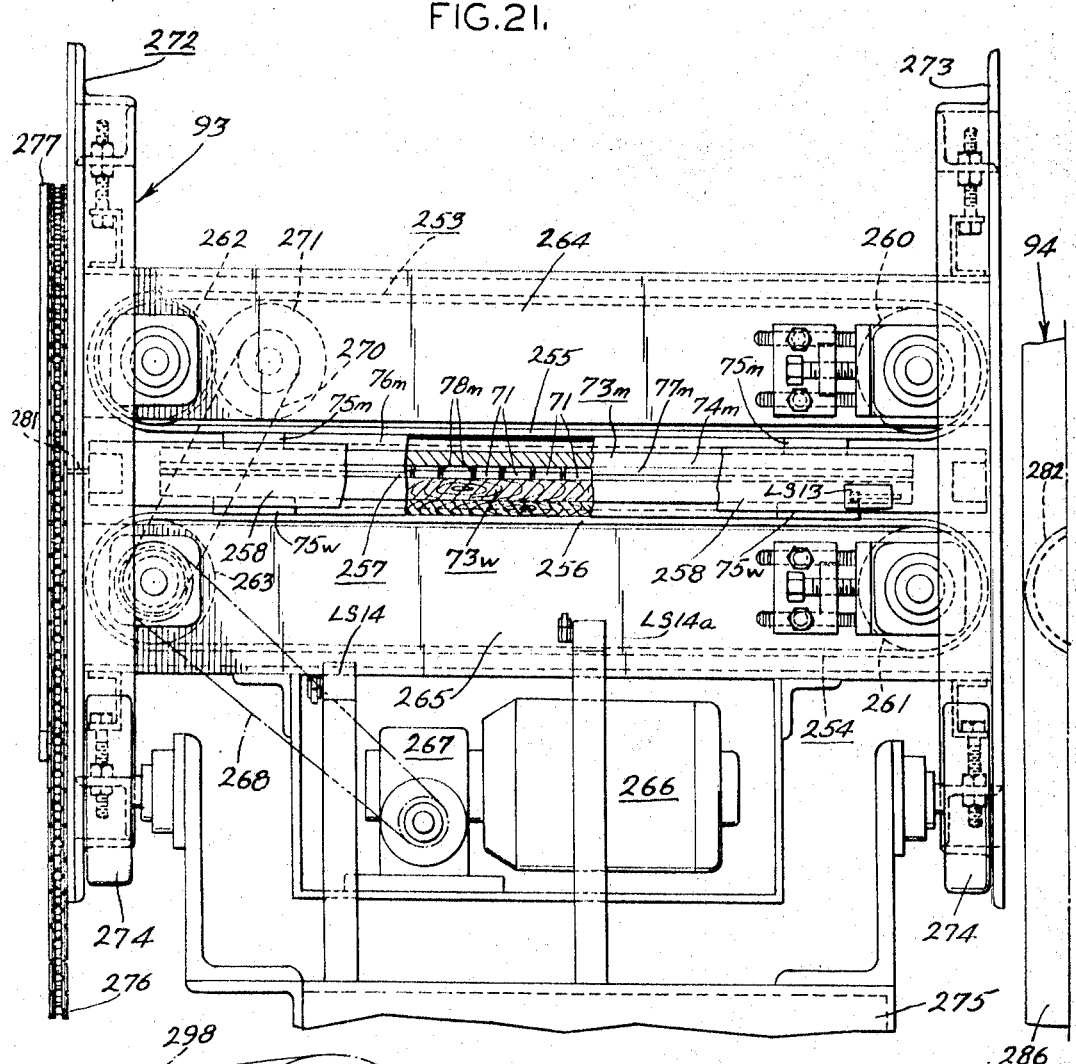
FIG. 21 is a side elevational view of the tray rollover mechanism partly broken away to show the doubled-up trays positioned therein.

The doubled-up trays are moved by the turning conveyor 245 between the opposed runs of the upper and lower rollover conveyors 253 and 254, the respective conveyor belts 255 and 256 of which are supported in parallel relation spaced apart a distance exactly corresponding to the thickness of the doubled-up tray assemblies. As shown in FIGS. 20 and 21, a doubled-up tray assembly 257 is securely clamped between the opposed belts 255 and 256, the resilience of the relatively thick, conveyor belting serving to hold the assembly firmly together and the side guides 258 preventing any possibility of misalignment of the assembly.

The conveyor belts 255 and 256 pass respectively around the idler rolls 260 and 261 and the drive rolls 262 and 263 which are jounaled to the respective upper and lower transverse frame assemblies 264 and 265. A motor 266 and gear reducer 267 mounted beneath the lower frame assembly drives the drive roller 263 through the drive chain 268. The upper drive roller 262 is driven from the lower drive roller by means of drive chain 270 and the drive gear 271 which engages a gear associated with the roller 262. This arrangement provides a driving of the opposed runs of the conveyor belt in the same direction and at the same speed.

The upper and lower frame assemblies 264 and 265 are connected at the ends thereof to the large flanged whels 272 and 273 which are adapted to rotate on the support rollers 274 mounted on the main frame 275. A drive chain 276 passes over a flanged chain ring 277 on the wheel 272 and is driven by the motor 278 and gear reducer 280 on the frame 275. The chain 276 is pinned to the wheel 272 at 281 which is possible since the unit rotates only through 180° and back so that the chain does not leave the wheel at the point at which it is pinned.

Figure 22:
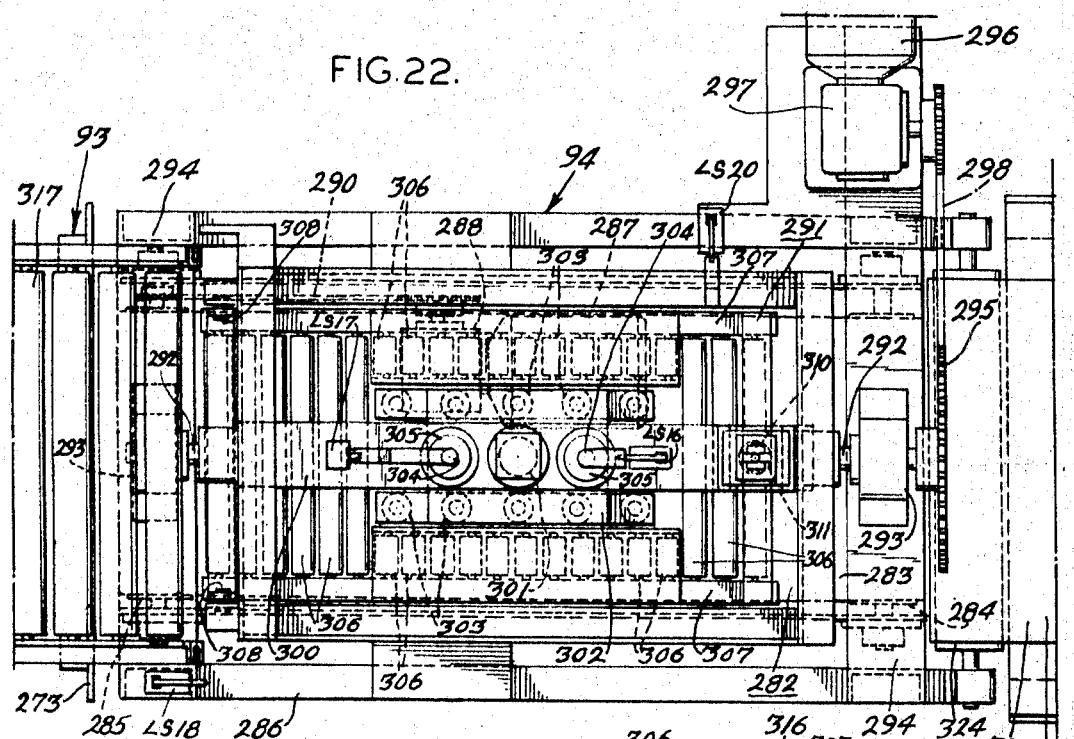
FIG. 22 is a plan view taken along line 22—22 of FIG. 2b showing the tray separating mechanism.

The doubled-up tray assembly 257 upon advancing into the position shown in FIGS. 20 and 21, is halted and the motor 278 actuated to rotate the rollover unit through 180° to invert the assembly, thus permitting the tile elements to drop from the wooden tray into the aligned pockets of the metal tray. The conveyors 253 and 254 are then started to move the inverted doubled-up assembly 257 from the rollover unit onto the adjacent belt conveyor 282 of the tray separating unit 94, the details of which are shown in FIGS. 22–24.

The conveyor 282 of the tray separating unit 94 includes conveyor belt 283 passing around idler roll 284 and drive roll 285 journaled on the frame 286 at opposite ends of the conveyor. The drive roll 285 is driven by motor 287 through gear reducer 288 and drive chain 290. A frame assembly 291 is mounted for rotation about a horizontal axis aligned with the conveyor 282, the shaft elements 292 of which are journaled in the bearing 293 on transverse elements 294 of the frame 286. The frame assembly is adapted for rotation through 180° and back by a gear 295 mounted on an extension of one of the shafts 292, the gear being driven by the motor 296 coupled with gear reducer 297 connected to the gear by chain 298.

Figure 24:
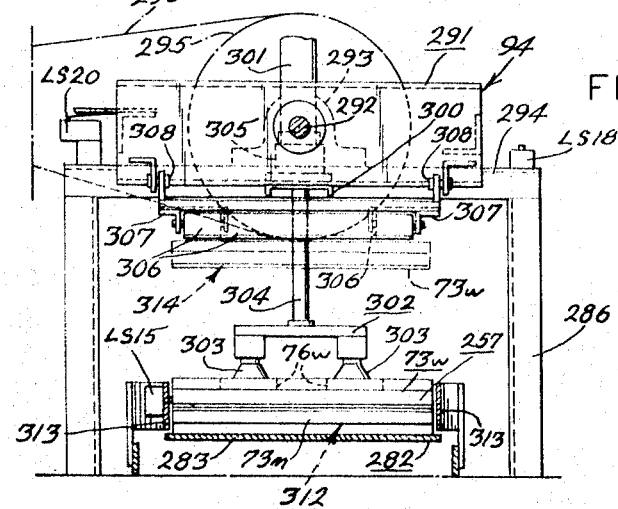
FIG. 24 is a view taken along line 24—24 of FIG. 23.
Figure 23:
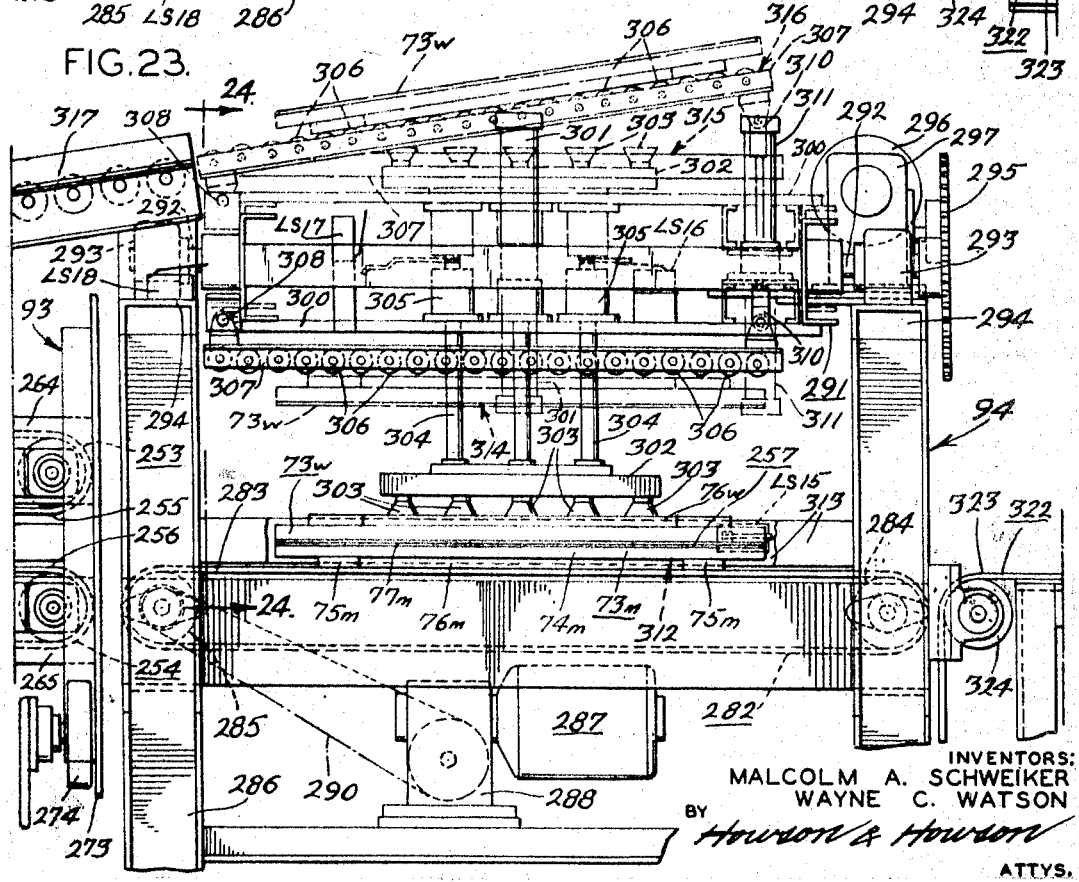
FIG. 23 is an elevational view of the apparatus shown in FIG. 22.

Mounted on a frame element 300 of the frame assembly 291 is a pneumatic cylinder 301 to which is retractably connected the vacuum head 302 as shown in FIGS. 23 and 24. The vacuum head includes two rows of vacuum cups 303 which are connected with a vacuum pump (connections and pump not shown) to provide, when the head is lowered by the cylinder 301 onto the back of the inverted wooden tray, a gripping of the vacuum cups 303 with the longitudinal battens 76w of the tray. Guide rods 304 extend vertically from the vacuum head parallel with the cylinder 301 and cooperate with the guide sleeves 305 on the frame element 300 to prevent rotation of the vacuum head.

A group of conveyor rolls 306 is mounted on a conveyor frame 307 pivotally supported at 308 at one end of the frame 291. The other end of the conveyor frame 307 is attached by the pivotal linkage 310 to a pneumatic cylinder 311 supported on the frame element 300. A number of the inner conveyor rolls on the conveyor frame 307 are interrupted to provide a well within which the vacuum head may be retracted as may be clearly seen in FIG. 22.

Upon movement of the double-up tray assembly 257 into the position 312 shown in FIGS. 23 and 24, the cylinder 301 is actuated to lower the vacuum head 302 to provide a firm seating of the vacuum cups 303 on the longitudinal battens 76w of the wooden tray. Side guides 313 adjacent the conveyor 282 position the assembly 257 to insure that the vacuum cups 303 will seat properly on the battens 76w. A vacuum pressure is then applied to the cups, following which the cylinder 301 is retracted to lift the wooden tray into the position 314 against the roll 306 as indicated in broken lines in FIGS. 23 and 24. The motor 296 is then actuated to rotate the frame assembly 291 through 180° which brings the conveyor frame 307 to the position 315 shown in FIG. 23. Upon actuation of cylinder 311 to raise the conveyor frame into the inclined position 316 shown in broken lines in FIG. 23, the wooden tray starts to roll downwardly over the rolls 306. As shown most clearly in FIGS. 1b and 2b, the tray moves downwardly from the conveyor frame 307 onto the inclined gravity roll conveyor 317 over the rollover unit and turning conveyor, and passes onto the transverse belt conveyor 318, being turned thereon by suitable friction belting around the turning roller 319 at the juncture of the conveyors. From the conveyor 318, the empty wooden trays are advanced onto the short turning conveyor 320 around the turning roller 321 and are thence advanced onto the conveyor 86 in the tray loading station 83 described above. The empty trays are permitted to accumulate on the lengthy conveyor 86 until removed for refilling by the operators 82.

Following the passage of a wooden tray from the inclined conveyor frame 307, the cylinder 311 is actuated to retract the conveyor frame to a horizontal position, and the motor 296 started to rotate the frame assembly 291 back to its original position ready to pick up the succeeding wooden tray. The conveyor 282, after removal of a wooden tray by the vacuum head, is started to advance the filled aluminum tray bearing the tile elements in a face down condition onto the belt conveyor 322, the belt 323 of which follows a triangular path around idler rolls 324 and 325 and drive roll 326. The metal trays pass from the conveyor 322 onto the transverse belt conveyor 327, the trays being turned thereon about the turning roller 328.

As shown in FIGS. 25a and 25b, the conveyor belt 330 of the conveyor 327 passes at one end around the drive roller 331 and, at its opposite end, around the idler roll 332, intermediate idler roll 333 and 334 on the conveyor frame assisting in maintaining the desired belt path. The drive roll 331 is driven by a motor 335 coupled to gear reducer 336 connected to the drive roller by drive chain 337. As indicated most clearly in the schematic plan view of FIG. 26, the drive roll 326 of the conveyor 322 is powered by the same motor, a chain 338 connecting the shaft of the drive drum 331 with a miter gear box 340 which in turn is coupled to the drive roller 326 by the chain 341. Suitable guide rails 342 are provided at each side of the tray conveyor 327 to prevent shifting of the filled metal trays on the conveyor and to properly align the trays for passage onto the tilt unit 95.

The tilt unit 95 includes a table 343 on which are mounted a set of conveyor rolls 344 aligned with and adapted to receive a tray from the conveyor 327. The trays passing onto the rolls 344 are halted against the stop rail 345 aligned parallel with the rolls 344. The table 343 is rotatably supported on a horizontal shaft 346 passing diagonally therebeneath by means of pillow blocks 347 secured to the underside of the table. The shaft 346 is journaled in pillow blocks 348 secured to the spaced vertical support members 350 as is shown most clearly in FIG. 25b.

The tilting of the table is effected by the rotation of the large cam 351 mounted on the shaft 352 which is driven by the motor 353 through gear reducer 354 and the drive chain 355. The table 343 includes a cam follower 356 spaced from the unit 346 which engages the periphery of the cam 351. Upon 180° rotation of the cam, the table is tilted to the inclined position 357 illustrated in broken lines in FIG. 30. A line of guide rollers 358 extendng above the table along the conveyor rolls 344 in conjunction with the guide rail 345 supports the tray in the inclined position of the table and prevents the displacement of the tray from the conveyor rolls. By arranging the shaft 346 diagonally with respect to the table 343 and a tray positioned thereon, the tilting of the table provides a diagonal tilting of the tile filled tray with a corner of the tray lowermost in the inclined position. The tile elements in the tray accordingly will gravitate to the corners of their individual tile pockets and will become aligned both transversely and longitudinally in the tile tray in their proper spaced relationship. A vibrator 360 is preferably mounted on the table 343 to prevent the possibility of tiles sticking in the tile pockets in an unaligned position during the tilting cycle.

Upon completion of the tilting cycle and the return of the table to the horizontal position, the filled metal trays with the tiles aligned in the tile pockets have the appearance shown in FIG. 31. The trays are moved from the tilt unit onto the chain conveyor 361 by the conveyor chains 362 between the rolls 344. The chains 362 have lugs 363 thereon, and are spaced to permit the lugs to engage the transverse battens 75m of the trays as shown in FIG. 29. The chains 362 pass over idler sprockets 364 on the idler shaft 365 journaled at one side of the table 343 and over drive sprockets 366 on the drive shaft 367 journaled at the opposite side of the table. The drive shaft 367 is driven by the rotation of the shaft 346, being connected therewith by means of the helical gears 368 on the ends thereof. The shaft 346 is connected by a similar helical gear arrangement 370 to a shaft 371 connected by drive chain 372 to the shaft 373 of the chain conveyor 361, the shaft 373 being driven by the chains 374 of the conveyor 361 which pass over the sprockets 375 keyed to the shaft.

As indicated for example in FIG. 35 and FIG. 41, the chain conveyor 361 extends through and beyond the adhesive applicator 96, the trays being advanced along the conveyor by lugs 376 on the chains 374. The chains 374 are driven as shown in FIG. 41 by the drive sprockets 377 on the drive shaft 378 connected by drive chains 379 to the gear reducer 380 and motor 381 mounted on the conveyor frame. The chains 374, after passing over the drive sprockets 377, pass around the tensioning assembly 382, idler sprockets 383 and the spaced idler sprockets 384 which serve to support the long horizontal return run of the conveyor. The idler sprockets 384 include slots 385 to receive the lugs 376, and the size of the sprockets is chosen according to the spacing between the lugs.

The drive chains 362 on the tilt unit being gear connected to the drive arrangement for the chains 374, they are accordingly synchronized with the chains 374 so that the lugs 363 and the lugs 376 of the respective chains will act cooperatively to move the trays smoothly from the tilt unit. The conveyor 361 includes side guides 386 which continue from the tilt unit into and through the dryer 100 to align the advancing trays.

The trays, containing the aligned tiles face down in the tile pockets, are advanced along the conveyor 361 into the adhesive applicator 96 wherein each tray is successively halted at the position 387 as shown in FIGS. 35 and 36. As described above with respect to the schematic view of FIG. 62, a tray lift mechanism 98 raises the tray against a perforated screen 97 into the position shown in broken lines at 388. As shown in FIGS. 35 and 36, the tray lift mechanism 98 includes a lift plate 390 attached to a vertical lift rod 391 which is journaled in the sleeve 392 on the frame assembly 393. Rotation of the plate 390 is prevented by guide rods 394 depending therefrom which are also journaled in the frame assembly 393 by sleeves 395. A roller 396, mounted at the lower end of the lift rod 391, engages the edge of a cam 397 on shaft 398 which is journaled in pillow blocks 400 on the frame assembly. Motor 401 connected with gear reducer 402 is adapted to drive the shaft 398 in rotation by means of the drive chain 403 and sprocket 404 keyed to the shaft. Upon rotation of the cam 397 through 180° from the position shown in FIG. 35, the lift rod 391 and plate 390 will be moved upwardly to raise the tray into the position 388 against the screen 97.

As indicated in FIG. 35, the screen 97 is secured along its transverse edges to the frame elements 405 by the spacer blocks 406. Also secured to the frame elements 405 are the spaced support arms 407 supporting parallel rails 408 which extend transversely above the perforated screen 97. The adhesive reservoir 99, as shown most clearly in FIG. 37, is mounted between the rails 408, being guided therealong by the upper rollers 410 and the lower rollers 411. The reservoir includes spaced transverse plates 412 extending between the rails 408 and being spaced above the screen. Resilient squeegees 413 depending downwardly from the plates 412 are held in resilient contact with the upper surface of the screen by the lower rollers 411 bearing against the underside of the rails 408.

The reservoir 99 is moved across the screen by the drive chains 414, the ends 415 of which are attached to the reservoir as shown in FIG. 37. The chains 414 pass over the idler sprockets 416 on the shaft 417 journaled to the frame at one end of the screen, and around drive sprockets 418 on drive shaft 420 journaled on the frame at the opposite end of the screen. The drive shaft 420 is driven by the motor 421 through gear reducer 422 and drive chain 423 as shown in FIG. 35.

The reservoir 99 is filled with adhesive when in the position shown in FIG. 37 adjacent the adhesive manifold 424, adhesive being pumped from a pressurized supply tank 425 shown in FIG. 1b through a suitable conduit 426 into the manifold 424 from which it passes into the reservoir through the filling tubes 427. As shown in FIGS. 38 and 39, the perforations of the screen 97 comprise a plurality of elongated apertures 428 which coincide with and are perpendicular to the spaces dividing the tile elements, the apertures spanning the spaces and permitting the beads of adhesive 72 to be deposited as shown in FIG. 39 in a manner which bridges the spaces between the tiles, some of the adhesive entering the spaces and serving as a spacing member to retain the tiles in the proper relation and alignment following curing of the adhesive and removal of the assembly from the tray. Although, as shown in FIG. 38, the aperture pattern provides a bead of adhesive at the midpoint of each tile edge which adjoins an adjacent tile edge, various adhesive bead patterns could be utilized with the apparatus by simply changing the screen to a screen having a different aperture pattern. The adhesive applicator may thus be used with different sizes and shapes of tiles by making only minor adjustments thereto.

Following the depositing of the adhesive on the back faces of the tile elements, the tray lift mechanism 98 is lowered to return the tray to the conveyor 361 whereupon the conveyor is started to move the tray from the adhesive applicator. To prevent the possibility that any adhesive may remain on the underside of the screen 97, a screen cleaning unit 430 is adapted to pass across the bottom of the screen following each application of adhesive. The screen cleaning unit 430 includes a trough 431 disposed on the support plate 432 for horizontal movement beneath the screen 97. Mounted on the support plate beyond the ends of the trough 431 are the pillow blocks 433 in which is journaled a shaft 434 upon which are mounted the resilient cleaning squeegees 435 as shown most clearly in FIGS. 35 and 36. During movement of the trough beneath the screen, the shaft 434 is rotated to provide a wiping action of the squeegees 435 against the surface of the screen to remove any traces of adhesive therefrom. A pan 436 is provided in the trough and includes a squeegee cleaning blade 437 which is adapted to transfer adhesive picked up by the squeegees to the pan which can be emptied periodically.

The support plate 432 rests on and is attached to the lower runs 438 of the roller chains 440, which runs are supported on the tracks 441 of the frame assembly as shown in FIG. 36. The chains 440 pass around sprockets 442 on shaft 443 at one end of the adhesive applicator and around drive sprockets 444 on shaft 445 journaled to the frame assembly at the opposite end of the applicator. Shaft 445 is driven, as shown in FIG. 35 and schematically in FIG. 40, by the motor 446 acting through reducer 447 and the drive chain and sprocket assembly 448.

Rotation of the shaft 434 supporting the cleaning squeegees 435 is provided by the roller chains 450 spaced outwardly from the chains 440 at each side of the applicator, the upper runs 451 of which are supported on the rails 452 as shown in FIG. 36. Sprockets 453 on the ends of the shaft 434 are engaged with the upper runs 451 of the chains 450 so that movement of the chains 450 relative to the shaft 434 provides a rotation of the cleaning squeegees 435 on the shaft. As shown in FIG. 33, the roller chains 450 pass over idler sprockets 545 on the idler shaft 455 journaled to one end of the frame assembly, and pass around drive sprockets 456 on the shaft 457 journaled at the other end of the frame assembly.

As shown in the schematic FIG. 40, shaft 457 is adapted for driving at two different speeds by the same drive motor 458 coupled to gear reducer 460. The motor-reducer unit, by means of drive chain 461, drives an intermediate shaft 462 journaled to the frame by pillow blocks 463. Axially aligned with the intermediate shaft 462 at the ends thereof are the low speed shaft 464 and the high speed shaft 465, respectively journaled in the bearings 466 and 467. Electric clutches 468 and 470 are selectively engageable for driving the shaft 464 or 465 from the shaft 462. The low speed shaft 464 is connected with the shaft 457 by means of the sprocket 471 on the end of the shaft 464, sprocket 472 on one end of shaft 457 and the drive chain 473. Similarly, the shaft 457 is adapted to be driven by the high speed shaft 465 by means of the sprocket 474 on the shaft 465, sprocket 475 on the shaft 457 and the connecting drive chain 476. The sprocket 475 being substantially smaller than the sprocket 472, the driving of shaft 457 by means of the shaft 465 will be at a substantially higher speed than the driving of the shaft 457 through the shaft 464. The need for a two speed drive for the cleaning squeegee shaft 434 is caused by the movement of the screen cleaning unit 430 in the same direction as the runs 451 of the chains 450 during one traverse across the screen, and in an opposite direction to the chain runs during the succeeding traverse of the screen. In order to provide a uniform speed and wiping action of the squeegees regardless of the direction of travel of the cleaning unit, the clutches 468 and 470 are selectively actuated to provide a higher drive speed of the chains 450 when the cleaning unit is traveling in the direction of travel of the upper runs 451, and a lower drive speed of the chains when the unit is traveling in the opposed direction to the upper chain runs.

Following the application of adhesive in the adhesive applicator, the trays are advanced on the conveyor 361 onto the dryer conveyor 480 which is a chain type conveyor having spaced chains 481 supported by chain guides 482 as shown in FIG. 42. As indicated above, the side guides 386 continue from the tilt unit into and through the dryer 100 and serve to maintain the trays in the proper position on the dryer conveyor. The chains 481 pass around idler sprockets 483 on shaft 484 at the entrance end of the dryer and are driven by the drive sprockets 485 on shaft 486 connected by the drive chain 487 to an appropriate motor drive at the discharge end of the dryer.

The dryer 100 through which the dryer conveyor 480 passes as shown in FIG. 42, comprises an elongated insulated enclosure 490 having an approximately square cross-section, along the insulated floor of which the trays are advanced. A spaced succession of gas burners 491 connected with appropriate gas inlet conduits 492 are supported by mounting brackets 493 above the tray conveyor. An exhaust duct 494 mounted in the dryer above the gas burners extends the length of the dryer housing and includes suitable openings for venting the combustion products from the dryer. As shown in FIG. 43, the exhaust duct is connected with a centrifugal exhaust blower 495 driven by motor 496 to provide a positive removal of the combustion gases. The blower is connected with a duct 497 leading to an exhaust stack.

Following the curing of the adhesive deposits in the dryer 100, the trays pass from the dryer conveyor 480 onto the belt driven roll conveyor 500 in the cooling duct 101. The conveyor 500 is of the same type as that described in detail with respect to conveyor 85 and includes spaced tray bearing rolls 502 driven by an underlying belt 503, groups of the rolls being automatically released from contact with the belt should the preceding rolls be occupied by a tray. The drive mechanism for the conveyor 500 is enclosed within the housing 504 shown in FIG. 47 and is similar to the drive mechanism shown in FIG. 51 and described hereinafter which drives the conveyor 84 described above.

As briefly described with respect to the tray loading station 83, the conveyor 84 passes initially through a cooling duct 128 similar to and running in spaced parallel relation with the cooling duct 101. The hot trays with the finished tile assemblies thereon, upon moving through the cooling duct 101, are transferred by the crossover conveyor 102 to the conveyor 84 traveling in the opposite direction within which the cooling of the trays and tile assemblies is continued. Cooling air is forced into the cooling ducts 101 and 103 by a blower 506 driven by motor 506a, the blower being mounted on the adjoining air inlet ducts 507 and 508 and adapted to deliver air into the respective air distribution chambers 509 and 510 in the upper portions of the cooling ducts. Cooling air passes downwardly through the perforated baffle plates 511 and 512 of the ducts onto the tile assemblies and trays, the air passing through the conveyor mechanisms into the air exhaust chambers 513 and 514 of the respective ducts. As shown in FIGS. 1a and 44, the exhaust chambers 513 and 514 are connected to a common air exhausted duct 515 which leads into the centrifugal exhaust blower 516 powered by the motor 517.

As shown in FIG. 51, the drive mechanism 520 for the conveyor 84 includes a drive roller 521, tensioning roll 522 and idler roll 523 around which the conveyor belt 524 is passed. The drive roll 521 is driven by the motor 525 and reducer 526 by means of the drive chain 527. As indicated above, the drive unit for the conveyor 500 is similar to the drive 520 although adapted to drive the drive belt 503 in the opposite direction.

The crossover conveyor 102 includes a set of conveyor rolls 530 driven by the underlying belt 531 which forms a continuation of the conveyor 500 and is adapted to move the trays successively against the stop 532 into position 533 as shown in FIG. 47. The trays are then advanced transversely by the spaced lugged conveyor chains 534 to a set of conveyor rolls 535 driven by the underlying belt 536, the rolls 535 being aligned with the conveyor 84. The conveyor rolls 530, chains 534 and rolls 535 are advanced sequentially to transfer the trays from the conveyor 500 to the conveyor 84.

The belt 531 passes over the idler rolls 537, tensioning roll 538 and the drive roll 540 on the shaft 541 as shown in FIG. 47. The belt 536 similarly passes over idler rollers 542, tensioning roller 543 and drive roller 544 on shaft 545. Both of the shafts 541 and 545 are driven by respective drive chains 546 and 547 from the drive shaft 548 which is connected by drive chain 550 to the motor 551 as shown schematically in FIG. 50. The drive chain 547 passes over the idler sprocket 552 to provide a reverse direction of rotation of the shaft 543 from that of the shaft 541.

The lugged chains 534 shown in FIG. 48 pass over idler sprockets 553 on shaft 554 and idler sprockets 555 on the shaft 556 and are driven by the drive sprockets 557 on the drive shaft 558. The shaft 558 is driven in rotation by a motor 560 and gear reducer 561 coupled by chain 562 to the transmission 563 from which chain 564 is connected with the speed control unit 565. An additional drive chain 566 connects the speed control unit with the stub shaft 567 which, by means of the chain 568, is connected to the shaft 558 to complete the drive linkage. By appropriate motor control means, as briefly described hereinafter, the trays are sequentially advanced from the conveyor 500 into the position 533 as shown in FIG. 47, and are then moved by the conveyor chains 534 onto the rollers 535 into the position 570 shown in FIG. 48. The trays moving from the rollers 535 onto the conveyor 84 travel through the cooling duct 103 into the tile loading station, the flipover unit, and end up finally at the inspection station.

With the above specific description of the present embodiment in mind, the operation of the apparatus and the tray sensing means for sequentially effecting the operating steps will be considered.

The filled wooden trays pass from the conveyor 85 onto the belt conveyor 200 and are advanced onto the roll conveyor 202. As each tray breaks the beam of the electric eye 571 shown in FIG. 8, the conveyor 200 is halted and the transfer conveyor 205 is started to advance the tray into the doubleup station. On reaching the doubleup station, the tray trips the limit switch LS1 which stops the transfer conveyor.

The metal trays bearing the finished tile assemblies meanwhile are moved along the conveyor 84 onto conveyor 144 and into the flipover unit 87 wherein the limit switch LS2 is triggered to stop the conveyor 144 and to start the described flipover cycle. When the flipover cycle has been completed, limit switch LS3 is actuated as shown in FIG. 12 to start both the flipover conveyor 146 and the belt conveyor 170 of the inspection station. When the tray reaches the position 171, limit switch LS4 is actuated which stops the conveyor 170 and starts the downward movement of the vertically movable carriage 187 to move the magnet 175 into contact with the ferrous block on the back of the tray. In moving into the position 171, the tray trips the limit switch LS5 which stops the flipover conveyor 146 and actuates the flipover mechanism to return the unit to receive the succeeding tray. On returning to its original position, the flipover unit contacts the limit switch LS6 which stops the flipover mechanism and starts both the conveyor 144 and the flipover conveyor 146 to feed in the succeeding tray, as shown in FIG. 11.

When the vertically movable conveyor reaches its lowered position as shown in FIG. 12, limit switch LS7 is closed which turns on the power in the magnet and starts the carriage upwardly to bring the empty tile tray to the position 196, at which position the tray engages limit switch LS8 which actuates the cylinder 182 to move the mechanism to the doubleup station. When the liftoff mechanism reaches the position 184 above the doubleup station, the one-way type limit switch LS9 is triggered as shown in FIG. 15 which starts the lowering of the vertically movable carriage. When the carriage reaches its lowermost position, as shown in FIG. 13 the limit switch LS10 is closed, which shuts off the magnet power to release the tray and, at the same time, starts the carriage 187 moving upwardly. On completing its upward movement, the carriage contacts the limit switch LS11 which actuates the cylinder 182 to return the horizontally movable carriage back to the inspection station. The switch LS11 at the same time starts the lugged chains 225 to move the doubled-up trays from the doubleup station The doubled-up trays pass onto the belt conveyor 234 and thence onto the turning conveyor 245, near the end of which the limit switch LS12 is contacted with stops the conveyor 245 if the rollover unit is operating. If the rollover unit is ready to receive a doubled-up tray assembly, the assembly is advanced between the rollover conveyors 253 and 254 and trips the limit switch LS13 as shown in FIG. 21 to stop the rollover conveyors and start the rollover mechanism to invert the trays. When the rollover unit has rotated through 180°, the limit switch LS14 is tripped as shown in FIG. 20 to stop the rollover mechanism and start the rollover conveyors to move the tray assembly onto the belt conveyor 282 of the tray separating unit 94. A succeeding tray, on passing into the rollover unit, trips limit switch LS13 to stop the rollover conveyors and start the rollover mechanisms in the reverse direction, the rotation being stopped upon contact of the unit with limit switch LS14a.

When the doubled-up tray assembly 257 reaches the position 312 as shown in FIG. 23, the limit switch LS15 contacts the wooden tray 73w of the assembly, stopping the conveyor 282 and actuating the cylinder 301 to lower the vacuum head 302 for removal of the wooden tray. When the wooden tray is removed, the limit switch LS15 is released whereupon the conveyor 282 starts moving to advance the metal tray onto the belt conveyor 322.

When the vacuum head reaches its lowermost position, the limit switch LS16 is tripped by one of the guide rods 304 to turn on the vacuum pressure in the vacuum cups 303 and, after a time delay, to start the upward movement of the vacuum head. When the limit switch LS17 is triggered by the other guide rod 304, the motor 296 is actuated to rotate frame assembly 291 through 180° to bring the frame 307 to the position 315 shown in FIG. 23. On completion of the frame rotation, limit switch LS18 is triggered as shown in FIG. 24 to stop the frame rotation, shut off the vacuum to the vacuum cups, and actuate the cylinder 311 to raise the conveyor frame into the position 316. The wooden tray passing from the conveyor frame 307 onto the conveyor 317 trips the one-way limit switch LS19 along the conveyor 317 which retracts the cylinder 311 to lower the conveyor frame 307 to the position 315, whereupon the limit switch LS20 as shown in FIG. 24 is engaged to actuate the motor 296 to return the frame assembly 291 to its initial position.

The metal trays pass from the conveyor 322 as described above onto the transverse belt conveyor 327 and advance onto the rolls 344 of the tilt unit. As a tray reaches the stop rail 345 of the tilt unit, the beam of an electric eye 572 is broken starting the tilt mechanism to lower the tray into the tilted position. The electric eye, in conjunction with limit switch LS21 at the end of the conveyor 327, stops the conveyor belt 330 when a succeeding tray reaches the limit switch LS21. As shown in FIGS. 27 and 30, the rotation of the shaft 352 rotates a group of control cams on the end of the shaft, one cam 573 of which actuates an air valve 574 to cycle the vibrator 360. Upon completion of the tilt cycle, the limit switch LS22, which is engaged by the cam 575, stops the tilt mechanism, following which the cam 576 coacting with the limit switch LS23 starts the chains 362 and chains 374 moving to advance the tray into the adhesive applicator.

When the tray reaches the position 387 as shown in FIGS. 35 and 36, the limit switch LS24 is triggered to start the upward movement of the tray lift mechanism. A series of cams on the shaft 398 control the sequence of the adhesive applicator operations, the cam 580 tripping the limit switch LS25 when the tray has been raised against the screen to the position 388. Tripping of the limit switch LS25 actuates the motor 421 to start the reservoir 99 across the screen, depositing adhesive on the tile back faces. On reaching the opposite end of the screen, the reservoir contacts the limit switch LS26 which reverses the reservoir drive mechanism and returns the reservoir to the position shown in FIG. 37 at which position the reservoir engages limit switch LS27 to stop the reservoir drive mechanism and start the downward travel of the tray lift mechanism 98. The tray lift mechanism is halted at its lowermost position by operation of the cam 579 with the limit switch LS27a. The reservoir 99 is refilled from the pressurized supply tank 425 following each application of adhesive to a tile assembly.

Following return of the tray to the conveyor, the cam 581 on the shaft 398 actuates the limit switch LS28 to start the motors 421 and 458 to move the screen cleaning unit 430 across the bottom of the screen. On reaching the opposite side of the screen, the screen cleaning unit trips the limit switch LS29 to stop the motor 421 and release the clutch 470 to stop rotation of the cleaning unit squeegees 435. The screen cleaning unit makes only one pass across the screen following each tray. After the succeeding tray is lowered from the screen, the unit is again actuated by the rotating of cam 582 against the limit switch LS30 to engage the clutch 460 and start the motor 421 for the return cleaning run, at the conclusion of which the cleaning unit trips the limit switch LS31 as shown in FIG. 33 and FIG. 34 which stops the cleaner drive mechanism.

A limit switch LS32 as shown in FIG. 35 is tripped by the downward movement of the tray lift unit and is provided as a safety feature to prevent the starting of the conveyor 361 until the tray lift unit has been retracted.

The trays pass from the adhesive applicator through the dryer and into the cooling duct 101 from which they pass onto the crossover conveyor 102. When the trays advance to the position 533 shown in FIG. 47 against the stop 532, the limit switch LS33 is closed which stops the motor 551 and starts the transmission 563 to actuate the chains 534 to transfer the trays from the rolls 530 to the rolls 535. On passing from the chains 534, the limit switch LS34 is released which stops the chain drive mechanism and once again starts the motor 551 to drive the rollers 535 and move the tray onto the conveyor 84, while, at the same time, advancing the succeeding tray onto the rolls 530. The trays continue on conveyor 84 through the cooling duct 103 and into the inspection station by way of the flipover unit in the manner described above.

As can be understood from the above description with the exception of the operators who fill the wooden tile trays and place them on the conveyor 85, and the operator who removes the finished assemblies at the inspection station, the apparatus is completely automatic and is adapted for continual operation.

We claim:

1. Apparatus for producing ceramic tile assemblies comprising means for filling the pockets of a partitioned tray with ceramic tile elements, means for arranging said tile elements in the tray pockets in an aligned, spaced orientation, and means for applying beads of a mastic adhesive to the back faces of the tile elements to connect the adjacent edges thereof, said means for applying beads of mastic adhesive comprising a screen, spaced apertures in said screen through which the adhesive is adapted to pass, means for supporting the tray and tile elements adjacent said screen, and means for presenting adhesive to said screen whereby the adhesive passes through said screen apertures onto the tile elements.

2. Apparatus for producing ceramic tile assemblies comprising means for filling the pockets of a partitioned metal tray with ceramic tile elements, means for arranging said tile elements in the tray pockets in an aligned, spaced orientation, means for applying beads of a mastic adhesive to the back faces of said tile elements to connect the adjacent edges thereof, and means for heating said tiles to cure said adhesive, said means for applying beads of mastic adhesive comprising a substantially horizontal screen having a plurality of spaced apertures through which the adhesive is adapted to pass, means for supporting the filled tray beneath said screen to position the tile elements beneath the screen in a predetermined orientation with said screen apertures, and adhesive reservoir means adapted to pass across the upper surface of said screen and present adhesive to said tile elements through said screen apertures.

3. Apparatus for producing ceramic tile assemblies comprising means for filling the pockets of a partitioned tray with ceramic tile elements, means for arranging said tile elements in the tray pockets in an aligned, spaced orientation, and means for applying beads of a mastic adhesive to the back faces of said tile elements to connect the adjacent edges thereof, said means for arranging said tile elements in the tray pockets comprising a table rotatable about a horizontal axis, said table being adapted to receive a tray of tiles, means for tilting said table and tray about said horizontal axis, and means for positioning the tray on said table to diagonally orient the rows of tiles with respect to the axis of rotation of said table, whereby upon tilting of the table and tray the tile elements are dropped into the corners of the tile pockets to effect the desired alignment and spacing thereof.

4. Apparatus for producing ceramic tile assemblies comprising means for filling the pockets of a partitioned metal tray with ceramic tile elements, means for arranging said tile elements in the tray pockets in an aligned, spaced orientation, means for applying beads of a mastic adhesive to the back faces of said tile elements to connect the adjacent edges thereof, and means for heating said tiles to cure said adhesive, said means for arranging said tile elements in the tray pockets comprising a table rotatable about a horizontal axis, said table being adapted to receive a tray of tiles, means for tilting said table and tray about said horizontal axis, means for positioning the tray on said table to diagonally orient the rows of tiles with respect to the axis of rotation of said table, and means for vibrating said table and tray during tilting of said table, whereby upon tilting and vibrating of the table and tray, the tile elements are dropped into the corners of the tile pockets to effect the desired alignment and spacing thereof.

5. Apparatus for producing ceramic tile assemblies comprising means for filling the pockets of a partitioned tray with ceramic tile elements, means for arranging said tile elements in the tray pockets in an aligned, spaced orientation and means for applying beads of a mastic adhesive to the back faces of said tile elements to connect the adjacent edges thereof, said means for arranging said tile elements in the tray pockets comprising a table rotatable about a horizontal axis, said table being adapted to receive a tray of tiles, means for tilting said table and tray about said horizontal axis, and means for positioning the tray on said table to diagonally orient the rows of tiles with respect to the axis of rotation of said table, whereby upon tilting of the table and tray, the tile elements are dropped into the corners of the tile pockets to effect the desired alignment and spacing thereof, said means for applying beads of a mastic adhesive comprising a screen, spaced apertures in said screen through which adhesive is adapted to pass, means for supporting the trays to position the tile elements adjacent said screen, and means for presenting adhesive to said screen whereby the adhesive passes through said screen apertures onto the tile elements.

6. Apparatus for producing ceramic tile assemblies comprising means for filling the pockets of a partitioned metal tray with ceramic tile elements, means for arranging said tile elements in the tray pockets in an aligned, spaced orientation, said means for arranging said tile elements in the tray comprising a table rotatable about the horizontal axis, said table being adapted to receive the tray of tiles, means for tilting said table and tray about said horizontal axis, and means for positioning the tray on said table to diagonally orient the rows of tiles with respect to the axis of rotation of said table whereby upon tilting of the table and tray, the tile elements are dropped into the corners of the tile pockets to effect the desired alignment and spacing thereof, means for applying beads of a mastic adhesive to the back faces of said tile elements to connect the adjacent edges thereof, said means for applying adhesive comprising a screen, spaced apertures in said screen through which adhesive is adapted to pass, means for supporting the tray to position the tile elements adjacent said screen, and means for presenting adhesive to said screen whereby the adhesive passes through sad screen apertures onto the tile elements, means for heating said tiles to cure said adhesive, means for cooling said tray and tile assembly, means for removing the tile assembly from the tray, and conveyor means for successively advancing a tray to effect a cyclical passage of the tray through the apparatus.

7. The apparatus as claimed in claim 6 wherein said means for filling the pockets of a partitioned metal tray comprises means for transferring the tile elements from a partitioned wooden tile tray into the partitioned metal tile tray.

8. Apparatus for producing ceramic tile assemblies comprising means for filling the pockets of a partitioned metal tray with ceramic tile elements, means for arranging said tile elements in the tray pockets in an aligned, spaced orientation, said means for arranging said tile elements comprising a table rotatable about a horizontal axis, said table being adapted to receive a tray of tiles, means for tilting said table and tray about said horizontal axis, means for positioning the tray on said table to diagonally orient the rows of tiles with respect to the axis of rotation of said table, and means for vibrating said table and tray during tilting of said table whereby upon tilting and vibrating of the table and tray, the tile elements are dropped into the corners of the tile pockets to effect the desired alignment and spacing thereof; means for applying beads of a mastic adhesive to the back faces of said tile elements to connect the adjacent edges thereof, said means for applying adhesive comprising a substantially horizontal screen having a plurality of spaced apertures through which the adhesive is adapted to pass, means for supporting a tray to position the tile elements beneath said screen in a predetermined orientation with said screen apertures, and adhesive reservoir means adapted to pass across the upper surface of said screen and present adhesive to said tile elements through said screen apertures; and means for heating said tiles to cure said adhesive.

9. Apparatus for producing ceramic tile assemblies comprising means for filling the pockets of a partitioned metal tray with ceramic tile elements, said means comprising means for transferring the tile elements from a face up position in a wooden tray to a face down position in the metal tray, means for arranging said tile elements in the tray pockets in an aligned, spaced orientation, said means for arranging said tile elements comprising a table rotatable about a horizontal axis, said table being adapted to receive a tray of tiles, means for tilting said table and tray about said horizontal axis, means for positioning the tray on said table to diagonally orient the rows of tiles with respect to the axis of rotation of said table, and means for vibrating said table and tray during tilting of said table whereby upon tilting and vibrating of the table and tray, the tile elements are dropped into the corners of the tile pockets to effect the desired alignment and spacing thereof; means for applying beads of a mastic adhesive to the back faces of said tile elements to connect the adjacent edges thereof, said means for applying adhesive comprising a substantially horizontal screen having a plurality of spaced apertures through which the adhesive is adapted to pass, means for supporting the tray to position the tile elements beneath said screen in a predetermined orientation with said screen apertures, and adhesive reservoir means adapted to pass across the upper surface of said screen and present adhesive to said tile elements through said screen apertures; means for heating said tiles to cure said adhesive, means for cooling said tray and tile assembly, means for removing the tile assembly from the tray, and conveyor means for successively advancing a tray to effect a cyclical passage of the tray through the apparatus.

10. Apparatus for producing ceramic tile assemblies comprising means for transferring an array of ceramic tile elements from a face up position in a wooden partitioned tile tray to a face down position in a metal partitioned tile tray, said means comprising means for lowering an empty inverted metal tray onto a tile-filled wooden tray in accurate registration therewith to form a doubled-up tray assembly, means for inverting said doubled-up tray assembly to permit the tile elements to drop from the wooden tray into the metal tray and means for removing the wooden tray from the metal tray; means for arranging the tile elements in the tray pockets of the metal tray in an aligned, spaced orientation, said means for arranging the tile elements comprising a table rotatable about a horizontal axis, said table being adapted to receive a tray of tiles, means for tilting said table and tray about said horizontal axis, and means for positioning the tray on said table to diagonally orient the rows of tiles with respect to the axis of rotation of said table, whereby upon tilting of the table and tray, the tile elements are dropped into the corners of the tile pockets to effect the desired alignment and spacing thereof; means for applying beads of a mastic adhesive to the back faces of said tile elements to connect the adjacent edges thereof, said adhesive applying means comprising a screen, spaced apertures in said screen through which adhesive is adapted to pass, means for supporting the tray to position the tile elements adjacent said screen, and means for presenting adhesive to said screen whereby the adhesive passes through said screen apertures onto the tile elements; and means for heating said tiles to cure said adhesive.

11. An adhesive applicator for applying adhesive to an array of tile elements to form a tile assembly, comprising a screen, spaced apertures in said screen through which adhesive is adapted to pass, means for supporting the tile elements adjacent said screen, and means for presenting adhesive to said screen whereby the adhesive passes through said screen apertures onto the tile elements.

12. An adhesive applicator for applying beads of a mastic adhesive to the back faces of an array of spaced ceramic tile elements to form a flexible tile assembly, comprising a substantially horizontal screen having a plurality of spaced apertures through which the adhesive is adapted to pass, means for supporting an array of tile elements beneath said screen in a predetermined orientation with said screen apertures, and adhesive reservoir means adapted to pass across the upper surface of said screen and present adhesive to said tile elements through said screen apertures.

13. The invention as claimed in claim 12 wherein said adhesive reservoir means comprised spaced squeegee elements disposed substantially transversely to the direction of travel of said reservoir means, and means for biasing said squeegee elements in resilient contact with the upper surface of said screen.

14. Apparatus as claimed in claim 12 including means for cleaning the underside of said screen following removal of said array of tile elements therefrom.

15. The apparatus as claimed in claim 14 wherein said means for cleaning the underside of said screen comprises a rotary squeegee assembly adapted to pass across said screen in resilient engagement therewith.

16. The invention as claimed in claim 15 wherein said rotary squeegee assembly comprises a rotatable shaft disposed parallel with and beneath said screen and adapted for movement across said screen, and a plurality of resilient cleaning squeegees mounted on said shaft and adapted for resilient engagement with the underside of said screen, means for rotating said shaft, and means for moving said shaft across said screen during rotation thereof.

17. Apparatus for arranging ceramic tile elements in spaced aligned rows in the tile pockets of a partitioned tile tray, comprising a table rotatable about a horizontal axis, said table being adapted to receive a tray of tiles, means for tilting said table and tray about said horizontal axis, and means for positioning the tray on said table to diagonally orient the rows of tiles with respect to the axis of rotation of said table, whereby upon tilting of the table and tray the tile elements are dropped into the corners of the tile pockets to effect the desired alignment and spacing thereof.

18. Apparatus for arranging ceramic tile elements in spaced aligned rows in the tile pockets of a partitioned tile tray, comprising a table rotatable about a horizontal axis, said table being adapted to receive a tray of tiles, means for tilting said table and tray about said horizontal axis, means for positioning the tray on said table to diagonally orient the rows of tiles with respect to the axis of rotation of said table, and means for vibrating said table and tray during tilting of said table whereby upon tilting and vibrating of the table and tray, the tile elements are dropped into the corners of the tile pockets to effect the desired alignment and spacing thereof.

19. Apparatus for arranging ceramic tile elements in spaced aligned rows in the tile pockets of a partitioned tile tray comprising a table rotatable about a horizontal axis, conveyor means on said table for receiving a tray of tiles and positioning said tray on said table to diagonally orient the rows of tiles with respect to said horizontal axis, means for tilting said table and tray about said horizontal axis, means for securing said tray in position on said table during the tilting of said table, and conveyor means on said table for moving the tray from the table following tilting thereof, whereby upon tilting of the table and tray, the tile elements are dropped into the corners of the tile pockets to effect the desired alignment and spacing thereof.

20. Apparatus for arranging ceramic tile elements in spaced aligned rows in the tile pockets of a partitioned tile tray, comprising a table rotatable about a horizontal axis, conveyor means on said table for receiving a tray of tiles and positioning said tray on said table to diagonally orient the rows of tiles with respect to said horizontal axis, means for tilting said table and tray about said horizontal axis, means for securing said tray in position on said table during the tilting of said table, conveyor means on said table for moving the tray from the table following tilting thereof, and means for vibrating said table and tray during tilting of said table, whereby upon tilting and vibrating of the table and tray, the tile elements are dropped into the corners of the tile pockets to effect the desired alignment and spacing thereof.

21. Apparatus for arranging ceramic tile elements in spaced, aligned transverse and longitudinal rows in the tile pockets of a partitioned tile tray, comprising a horizontal table rotatable about a horizontal axis, conveyor means on said table for advancing a tray of tiles onto said table, stop means on said table contiguous said conveying means adapted to engage an end and a side of the tray to position the tray on the table to diagonally orient the rows of tiles with respect to the axis of rotation of said table, means for tilting said table about said horizontal axis with the corner of the tray between said stop means being lowermost in the inclined position of the table, means for vibrating said table and tray during the tilting thereof, means for returning said table and tray to the horizontal position, and conveyor means for moving the tray from said table, whereby upon tilting and vibrating of the table and tray, said tile elements are dropped into the corners of the tile pockets to effect the desired transverse and longitudinal alignment and spacing of the tile elements.

22. Apparatus for transferring an array of ceramic tile elements from a face up position in a first partitioned tile tray to a face down position in a second partitioned tile tray, said apparatus comprising means for lowering an empty inverted second tray onto a tile filled first tray in accurate registration therewith to form a doubled-up tray assembly, means for inverting said doubled-up tray assembly to permit the tile elements to drop from the first tray into the second tray, and means for removing said first tray from said second tray.

23. Apparatus for transferring an array of ceramic tile elements from a face up position in a first partitioned tile tray to a face down position in a second partitioned tile tray, said apparatus comprising means for conveying a first tray filled with tile elements into a doubleup station, means for delivering an empty second tray into said doubleup station and lowering said second tray in an inverted position onto said tile-filled first tray in accurate registration therewith to form a doubled-up tray assembly, means for advancing said doubled-up tray assembly from the doubleup station into a rollover unit, said rollover unit being adapted to invert said doubled-up tray assembly to permit the tile elements to drop from the first tray into the second tray, and means for advancing the inverted doubled-up tray assembly from the rollover unit into a tray separating unit, said tray separating unit being adapted to remove the empty first tray from the tile-filled second tray.

24. The invention is claimed in claim 23 wherein said rollover unit comprises opposed parallel conveyor belts adapted to receive the doubled-up tray assembly therebetween, and means rotatably supporting said conveyor belts adapted to rotate said belts and tray assembly through 180° to transfer the tile elements from the first to the second tray.

25. The invention as claimed in claim 23 wherein said tray separating unit comprises vacuum tray pickup means for lifting the first tray from said second tray.

References Cited
UNITED STATES PATENTS

| | | | |
|---|---|---|---|
| 2,961,946 | 11/1960 | Quist | 101—123 |
| 3,041,785 | 7/1962 | MacDonald et al. | 156—305 XR |
| 3,162,937 | 12/1964 | Schweiker | 29—211 |
| 3,177,568 | 4/1965 | Schweiker | 29—211 |
| 3,291,676 | 12/1966 | Watson | 156—561 |
| 3,322,591 | 5/1967 | Cleverly | 156—297 |

HAROLD ANSHER, Primary Examiner

J. D. SMITH, Assistant Examiner

U.S. Cl. X.R.

156—562, 578